United States Patent
Artman et al.

(10) Patent No.: US 12,536,521 B2
(45) Date of Patent: *Jan. 27, 2026

(54) PEER-TO-PEER PAYMENT PROCESSING

(71) Applicant: Bytedance Inc., Wilmington, DE (US)

(72) Inventors: Tuomas Artman, San Francisco, CA (US); Jyri Engestrom, San Francisco, CA (US); Ulf Schwekendiek, San Francisco, CA (US)

(73) Assignee: BYTEDANCE INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,456

(22) Filed: Apr. 8, 2024

(65) Prior Publication Data

US 2024/0362609 A1 Oct. 31, 2024

Related U.S. Application Data

(63) Continuation of application No. 17/448,574, filed on Sep. 23, 2021, now Pat. No. 11,983,693, which is a (Continued)

(51) Int. Cl.
*G06Q 20/32* (2012.01)
*G06Q 20/02* (2012.01)
(Continued)

(52) U.S. Cl.
CPC .......... *G06Q 20/322* (2013.01); *G06Q 20/02* (2013.01); *G06Q 20/0855* (2013.01);
(Continued)

(58) Field of Classification Search
None
See application file for complete search history.

(56) References Cited

U.S. PATENT DOCUMENTS

| 2,153,480 A | 4/1939 | Pierce |
| 6,208,468 B1 | 3/2001 | Togino et al. |
| (Continued) | | |

FOREIGN PATENT DOCUMENTS

| CN | 102713955 A | 10/2012 |
| EP | 1017030 A2 | 7/2000 |
| (Continued) | | |

OTHER PUBLICATIONS

Luo, Wanying, and Urs Hengartner. "Veriplace: a privacy-aware location proof architecture." Proceedings of the 18th SIGSPATIAL International Conference on Advances in Geographic Information Systems. (Year: 2010).

(Continued)

*Primary Examiner* — Matthew S Gart
*Assistant Examiner* — Liz P Nguyen
(74) *Attorney, Agent, or Firm* — Alston & Bird LLP

(57) ABSTRACT

Systems and related methods facilitating payments with a mobile device are discussed herein. Circuitry in a networked-based payment system may be configured to receive payment information from a first device. The first device may include circuitry configured to wirelessly receive wallet identifying data from the payment system. The wallet identifying data may be used to secure messages between the first device and another device over a wireless link. For example, the first device may be configured to send the wallet identifying data to a second device, which may then communicate with the payment system. In response, consumer identifying data associated with the wallet identifying data may be received by the second device from the payment system. In some embodiments, use of wallet identifying data may be applied to other communications, such as for messages that authorize payment.

20 Claims, 13 Drawing Sheets

Related U.S. Application Data continuation of application No. 16/394,659, filed on Apr. 25, 2019, now Pat. No. 11,164,174, which is a continuation of application No. 15/172,032, filed on Jun. 2, 2016, now Pat. No. 10,325,253, which is a continuation of application No. 13/801,520, filed on Mar. 13, 2013, now abandoned.

(60) Provisional application No. 61/715,229, filed on Oct. 17, 2012.

(51) Int. Cl.
  G06Q 20/08 (2012.01)
  G06Q 20/20 (2012.01)
  G06Q 20/36 (2012.01)
  H04W 76/10 (2018.01)

(52) U.S. Cl.
  CPC ............ *G06Q 20/20* (2013.01); *G06Q 20/36* (2013.01); *H04W 76/10* (2018.02)

(56) References Cited

U.S. PATENT DOCUMENTS

| | | | |
|---|---|---|---|
| 6,327,578 B1 | 12/2001 | Linehan | |
| 6,487,180 B1 | 11/2002 | Borgstahl et al. | |
| 6,764,013 B2 | 7/2004 | Ben-Aissa | |
| 6,812,851 B1 | 11/2004 | Dukach et al. | |
| 6,873,974 B1 | 3/2005 | Schutzer | |
| 7,177,847 B2 | 2/2007 | Atkinson et al. | |
| 7,229,013 B2 | 6/2007 | Ben-Aissa | |
| 7,411,491 B2 | 8/2008 | Klabunde et al. | |
| 7,475,813 B2 | 1/2009 | Swanson, Sr. | |
| 7,527,194 B2 | 5/2009 | Truitt et al. | |
| 7,584,118 B1 | 9/2009 | Bellare et al. | |
| 7,609,821 B2 | 10/2009 | Delaney et al. | |
| 7,653,883 B2 | 1/2010 | Hotelling et al. | |
| 7,774,231 B2 | 8/2010 | Pond et al. | |
| 7,891,560 B2 | 2/2011 | Hammad | |
| 7,934,986 B2 | 5/2011 | Kane et al. | |
| 8,045,967 B2 | 10/2011 | Lovegreen et al. | |
| 8,131,619 B1 | 3/2012 | Veselka | |
| 8,224,700 B2 | 7/2012 | Silver | |
| 8,229,853 B2 | 7/2012 | Dispensa et al. | |
| 8,284,061 B1 | 10/2012 | Dione | |
| 8,370,264 B1 | 2/2013 | Wei et al. | |
| 8,844,002 B2 | 9/2014 | Monahan et al. | |
| 9,098,990 B2 | 8/2015 | Rasband et al. | |
| 9,117,231 B2 | 8/2015 | Rodgers et al. | |
| 9,576,286 B1 | 2/2017 | Artman et al. | |
| 9,665,898 B2 | 5/2017 | Scholl et al. | |
| 9,674,050 B2 | 6/2017 | Martin et al. | |
| 9,852,409 B2 | 12/2017 | Artman et al. | |
| 10,148,659 B2 | 12/2018 | Nandakumar | |
| 10,325,253 B2 | 6/2019 | Artman et al. | |
| 10,482,511 B1 | 11/2019 | Artman et al. | |
| 11,062,287 B2 | 7/2021 | Artman et al. | |
| 2001/0029496 A1 | 10/2001 | Otto et al. | |
| 2002/0017561 A1 | 2/2002 | Tomoike | |
| 2002/0029342 A1 | 3/2002 | Keech | |
| 2002/0072921 A1 | 6/2002 | Boland et al. | |
| 2002/0073044 A1 | 6/2002 | Singhal | |
| 2002/0077993 A1 | 6/2002 | Immonen et al. | |
| 2002/0083342 A1 | 6/2002 | Webb et al. | |
| 2002/0107610 A1 | 8/2002 | Kaehler et al. | |
| 2002/0107791 A1 | 8/2002 | Nobrega et al. | |
| 2002/0142753 A1 | 10/2002 | Pecen et al. | |
| 2002/0151313 A1 | 10/2002 | Stead | |
| 2002/0174023 A1 | 11/2002 | Grey et al. | |
| 2003/0037113 A1 | 2/2003 | Petrovykh | |
| 2003/0088682 A1 | 5/2003 | Hlasny | |
| 2003/0172036 A1 | 9/2003 | Feigenbaum | |
| 2003/0208409 A1 | 11/2003 | Mault | |
| 2004/0030601 A1 | 2/2004 | Pond et al. | |
| 2004/0107170 A1 | 6/2004 | Labrou et al. | |
| 2004/0116074 A1 | 6/2004 | Fujii et al. | |
| 2004/0143473 A1 | 7/2004 | Tivey et al. | |
| 2004/0230536 A1 | 11/2004 | Fung et al. | |
| 2005/0028082 A1 | 2/2005 | Topalov et al. | |
| 2005/0043996 A1 | 2/2005 | Silver | |
| 2005/0182680 A1 | 8/2005 | Jones et al. | |
| 2005/0187873 A1* | 8/2005 | Labrou ............... G06Q 20/326 |
| | | | 705/40 |
| 2005/0256841 A1 | 11/2005 | Rawat et al. | |
| 2005/0273345 A1 | 12/2005 | Castillejo Romero | |
| 2006/0069763 A1 | 3/2006 | Kido | |
| 2006/0080545 A1 | 4/2006 | Bagley | |
| 2006/0085267 A1 | 4/2006 | Lovegreen et al. | |
| 2006/0122855 A1 | 6/2006 | Prorock | |
| 2006/0156060 A1 | 7/2006 | Forrer et al. | |
| 2006/0165060 A1 | 7/2006 | Dua | |
| 2006/0178943 A1 | 8/2006 | Rollinson et al. | |
| 2006/0218043 A1 | 9/2006 | Rosenzweig et al. | |
| 2007/0012763 A1 | 1/2007 | Van et al. | |
| 2007/0061209 A1 | 3/2007 | Jackson | |
| 2007/0150371 A1 | 6/2007 | Gangji | |
| 2007/0162337 A1 | 7/2007 | Hawkins et al. | |
| 2007/0219923 A1 | 9/2007 | Shea et al. | |
| 2007/0250355 A1 | 10/2007 | Leet et al. | |
| 2007/0257105 A1 | 11/2007 | Owen et al. | |
| 2007/0280269 A1 | 12/2007 | Rosenberg | |
| 2007/0282739 A1 | 12/2007 | Thomsen | |
| 2007/0291915 A1 | 12/2007 | Tseitlin et al. | |
| 2008/0010193 A1 | 1/2008 | Rackley et al. | |
| 2008/0051122 A1 | 2/2008 | Fisher | |
| 2008/0064374 A1 | 3/2008 | Coffing | |
| 2008/0065374 A1 | 3/2008 | Mittal et al. | |
| 2008/0065490 A1 | 3/2008 | Novick et al. | |
| 2008/0090612 A1 | 4/2008 | Glinka | |
| 2008/0097851 A1 | 4/2008 | Bemmel et al. | |
| 2008/0143487 A1 | 6/2008 | Hulvey | |
| 2008/0147546 A1 | 6/2008 | Weichselbaumer et al. | |
| 2008/0162318 A1 | 7/2008 | Butler et al. | |
| 2008/0182616 A1 | 7/2008 | Connors et al. | |
| 2008/0208744 A1 | 8/2008 | Arthur et al. | |
| 2008/0222004 A1 | 9/2008 | Pollock et al. | |
| 2008/0271119 A1 | 10/2008 | Manne et al. | |
| 2009/0018961 A1 | 1/2009 | Seven et al. | |
| 2009/0030749 A1 | 1/2009 | Drummond et al. | |
| 2009/0037286 A1 | 2/2009 | Foster | |
| 2009/0063312 A1 | 3/2009 | Hurst | |
| 2009/0070263 A1 | 3/2009 | Davis et al. | |
| 2009/0076896 A1 | 3/2009 | Dewitt et al. | |
| 2009/0125997 A1 | 5/2009 | Cook | |
| 2009/0167553 A1 | 7/2009 | Hong et al. | |
| 2009/0192935 A1 | 7/2009 | Griffin et al. | |
| 2009/0204881 A1 | 8/2009 | Murthy et al. | |
| 2009/0265229 A1 | 10/2009 | Sidhu | |
| 2009/0271295 A1 | 10/2009 | Hodge | |
| 2010/0082481 A1 | 4/2010 | Lin et al. | |
| 2010/0094701 A1 | 4/2010 | Ghosh et al. | |
| 2010/0145861 A1 | 6/2010 | Law et al. | |
| 2010/0250549 A1 | 9/2010 | Muller et al. | |
| 2010/0252624 A1 | 10/2010 | Van et al. | |
| 2010/0274680 A1 | 10/2010 | Carlson et al. | |
| 2010/0276484 A1 | 11/2010 | Banerjee et al. | |
| 2010/0320266 A1 | 12/2010 | White | |
| 2010/0325047 A1 | 12/2010 | Carlson et al. | |
| 2011/0010422 A1 | 1/2011 | Bezancon et al. | |
| 2011/0029362 A1 | 2/2011 | Roeding et al. | |
| 2011/0029370 A1 | 2/2011 | Roeding et al. | |
| 2011/0041170 A1 | 2/2011 | Wankmueller | |
| 2011/0047608 A1 | 2/2011 | Levenberg | |
| 2011/0055005 A1 | 3/2011 | Lang | |
| 2011/0057025 A1 | 3/2011 | Denzer et al. | |
| 2011/0088087 A1 | 4/2011 | Kalbratt | |
| 2011/0093351 A1 | 4/2011 | Afana | |
| 2011/0112897 A1 | 5/2011 | Tietzen et al. | |
| 2011/0173096 A1 | 7/2011 | Bui | |
| 2011/0191196 A1 | 8/2011 | Orr et al. | |
| 2011/0218911 A1 | 9/2011 | Spodak | |
| 2011/0238499 A1 | 9/2011 | Blackhurst et al. | |
| 2011/0313867 A9 | 12/2011 | Andrew | |
| 2011/0320293 A1 | 12/2011 | Khan | |

(56) References Cited

U.S. PATENT DOCUMENTS

| | | |
|---|---|---|
| 2012/0005023 A1 | 1/2012 | Graff |
| 2012/0016745 A1 | 1/2012 | Hendrickson |
| 2012/0029990 A1 | 2/2012 | Fisher |
| 2012/0030066 A1 | 2/2012 | Stringfellow et al. |
| 2012/0036042 A1 | 2/2012 | Graylin et al. |
| 2012/0072311 A1 | 3/2012 | Khan |
| 2012/0088487 A1 | 4/2012 | Khan |
| 2012/0095852 A1* | 4/2012 | Bauer ............... G06Q 20/3223 705/16 |
| 2012/0136754 A1 | 5/2012 | Underwood |
| 2012/0150669 A1 | 6/2012 | Langley et al. |
| 2012/0158528 A1 | 6/2012 | Hsu et al. |
| 2012/0158541 A1 | 6/2012 | Ganti et al. |
| 2012/0172062 A1 | 7/2012 | Altman et al. |
| 2012/0173350 A1 | 7/2012 | Robson |
| 2012/0173431 A1 | 7/2012 | Ritchie et al. |
| 2012/0179528 A1 | 7/2012 | Ortiz et al. |
| 2012/0209729 A1 | 8/2012 | Lovegreen |
| 2012/0209730 A1 | 8/2012 | Garrett |
| 2012/0233005 A1 | 9/2012 | White |
| 2012/0239417 A1 | 9/2012 | Pourfallah et al. |
| 2012/0239479 A1 | 9/2012 | Amaro et al. |
| 2012/0239560 A1 | 9/2012 | Pourfallah et al. |
| 2012/0246079 A1* | 9/2012 | Wilson ............... G06Q 20/3226 705/67 |
| 2012/0253908 A1 | 10/2012 | Ouimet et al. |
| 2012/0253913 A1 | 10/2012 | Richard |
| 2012/0254020 A1 | 10/2012 | Debow |
| 2012/0271697 A1 | 10/2012 | Gilman et al. |
| 2012/0271759 A1 | 10/2012 | Lee |
| 2012/0290376 A1 | 11/2012 | Dryer et al. |
| 2012/0290449 A1 | 11/2012 | Mullen et al. |
| 2012/0310743 A1 | 12/2012 | Johri |
| 2012/0317628 A1 | 12/2012 | Yeager |
| 2012/0323664 A1 | 12/2012 | Klems |
| 2012/0330769 A1 | 12/2012 | Arceo |
| 2013/0024364 A1 | 1/2013 | Shrivastava et al. |
| 2013/0030915 A1 | 1/2013 | Statler et al. |
| 2013/0031006 A1 | 1/2013 | Mccullagh et al. |
| 2013/0036048 A1 | 2/2013 | Campos et al. |
| 2013/0036051 A1 | 2/2013 | Giordano et al. |
| 2013/0046634 A1 | 2/2013 | Grigg et al. |
| 2013/0047242 A1 | 2/2013 | Radhakrishnan |
| 2013/0073365 A1 | 3/2013 | Mccarthy |
| 2013/0097031 A1 | 4/2013 | Royyuru et al. |
| 2013/0138518 A1 | 5/2013 | White et al. |
| 2013/0144731 A1 | 6/2013 | Baldwin et al. |
| 2013/0151357 A1 | 6/2013 | Havas et al. |
| 2013/0159080 A1 | 6/2013 | Wu et al. |
| 2013/0159119 A1 | 6/2013 | Henderson et al. |
| 2013/0159181 A1 | 6/2013 | Hueck |
| 2013/0166917 A1 | 6/2013 | Granbery |
| 2013/0173475 A1 | 7/2013 | Lund |
| 2013/0191174 A1 | 7/2013 | Zhou et al. |
| 2013/0191227 A1 | 7/2013 | Pasa et al. |
| 2013/0198080 A1 | 8/2013 | Anderson et al. |
| 2013/0282438 A1 | 10/2013 | Hunter et al. |
| 2013/0282533 A1 | 10/2013 | Foran-Owens |
| 2013/0304642 A1 | 11/2013 | Campos |
| 2013/0317928 A1 | 11/2013 | Laracey |
| 2013/0339233 A1 | 12/2013 | Lee et al. |
| 2013/0346302 A1 | 12/2013 | Purves et al. |
| 2014/0006182 A1 | 1/2014 | Wilson |
| 2014/0006205 A1 | 1/2014 | Berry et al. |
| 2014/0032297 A1 | 1/2014 | Germann et al. |
| 2014/0037193 A1 | 2/2014 | El et al. |
| 2014/0040051 A1 | 2/2014 | Ovick et al. |
| 2014/0058862 A1 | 2/2014 | Celkonas |
| 2014/0058938 A1 | 2/2014 | Mcclung, III |
| 2014/0067677 A1 | 3/2014 | Ali et al. |
| 2014/0074655 A1 | 3/2014 | Lim et al. |
| 2014/0099981 A1 | 4/2014 | Horbal |
| 2014/0100973 A1 | 4/2014 | Brown et al. |
| 2014/0108108 A1 | 4/2014 | Artman et al. |
| 2014/0108247 A1 | 4/2014 | Artman et al. |
| 2014/0114776 A1 | 4/2014 | Solanki et al. |
| 2014/0143018 A1 | 5/2014 | Nies et al. |
| 2014/0229375 A1 | 8/2014 | Zaytzsev et al. |
| 2014/0244354 A1 | 8/2014 | Seifert |
| 2014/0310117 A1 | 10/2014 | Moshal |
| 2014/0344153 A1 | 11/2014 | Raj et al. |
| 2015/0046276 A1 | 2/2015 | Artman et al. |
| 2015/0095133 A1 | 4/2015 | Parker et al. |
| 2015/0095134 A1 | 4/2015 | Parker et al. |
| 2015/0269557 A1 | 9/2015 | Artman et al. |
| 2019/0295066 A1 | 9/2019 | Zaytzsev et al. |
| 2019/0333090 A1 | 10/2019 | Roeding et al. |

FOREIGN PATENT DOCUMENTS

| | | |
|---|---|---|
| EP | 2909799 A1 | 8/2015 |
| EP | 2954474 A2 | 12/2015 |
| EP | 2973322 A1 | 1/2016 |
| WO | 2009/122356 A1 | 10/2009 |
| WO | 2011/112752 A1 | 9/2011 |
| WO | 2012/106757 A1 | 8/2012 |
| WO | 2012/135115 A2 | 10/2012 |
| WO | 2013/066910 A1 | 5/2013 |
| WO | 2013/091145 A1 | 6/2013 |
| WO | 2014/062229 A1 | 4/2014 |
| WO | 2014/062230 A1 | 4/2014 |
| WO | 2014/124395 A2 | 8/2014 |
| WO | 2014/124935 A1 | 8/2014 |
| WO | 2014/164228 A1 | 10/2014 |
| WO | 2015/048476 A1 | 4/2015 |

OTHER PUBLICATIONS

EP Supplementary European Search Report for application 13846999.4 mailed Apr. 4, 2016.

U.S. Appl. No. 16/196,918, filed Nov. 20, 2018 entitled "Consumer Device Payment Token Management".

International Search Report and Written Opinion of the International Searching Authority for application PCT/US2013/033145 mailed Jun. 21, 2013.

Keats et al. Bayesian inference for source determination with applications to a complex urban environment. Atmospheric Environment 41 (2007) 465-479. (Year: 2007).

NFC, Security Risks of Near Field Communication, 2017, 1-2, retrieved on Sep. 28, 2021.

PCT international Preliminary Report on Patentability for Application PCT/US2013/033145 issued Apr. 21, 2015.

PCT international Preliminary Report on Patentability for Application PCT/US2013/033169 issued Apr. 21, 2015.

PCT international Preliminary Report on Patentability for Application PCT/US2013/062389 issued Mar. 31, 2015.

PCT International Preliminary Report on Patentability for application PCT/US2014/015630 issued Aug. 11, 2015.

PCT International Preliminary Report on Patentability for application PCT/US2014/021387 issued Sep. 15, 2015.

PCT International Preliminary Report on Patentability for application PCT/US2014/057762 issued Mar. 29, 2016.

PCT International Search Report and written Opinion of the Intenational Searching Authority for application PCT/US2014/015630 mailed Dec. 8, 2014.

PCT International Search Report and Written Opinion of the International Searching Authority for application PCT/US2014/021387 mailed Jul. 7, 2014.

PCT International Search Report and Written Opinion of the International Searching Authority for application PCT/US2014/057762 mailed Dec. 29, 2014.

PCT International Search Report and Written Opinion of the International Searching Authority for applicationPCT/US2013/062389 mailed May 27, 2014.

PCT International Search Report for application PCT/US2013/033169 mailed Jun. 10, 2013.

PCT Written Opinion of the International Searching Authority for application PCT/US2013/033169 mailed Jun. 10, 2013.

(56) References Cited

OTHER PUBLICATIONS

R. Buyya, D. Abramson and S. Venugopal, "The Grid Economy," in Proceedings of the IEEE, vol. 93, No. 3, pp. 698-714, Mar. 2005. (Year: 2005).
Roberts, Paul F., Bluetooth—Sniffing Highway Traffic Monitors Vulnerable to MITM Attack, Dec. 3, 2012, the security ledger, 1-4, https://securityledger.com/2012/12/bluetooth-sniffing-highway-traffic-monitors-vulnerable-to-mitm-attack/, retrieved on Sep. 28, 2021.
Saroiu, Stefan, and Alec Wolman. "Enabling new mobile applications with location proofs." Proceedings of the 10th workshop on Mobile Computing Systems and Applications. 2009. (Year: 2009).
U.S. Patent Application filed Sep. 27, 2012, U.S. Appl. No. 61/706,664.
U.S. Appl. No. 61/715,229, filed Oct. 17, 2012, In re: Artman et al. entitled Peer-to-Peer Payment Processing, 57 pages.
U.S. Appl. No. 61/715,230, filed Oct. 17, 2012, In re: Artman et al. entitled Consumer Presence Based Deal Offers, 73 pages.
Waveform, What causes weak cell phone signal and dropped calls?, 1-3, https://www.waveform.com/pages/causes-of-weak-signal, retrieved on Sep. 28, 2021.
Wilson, Matthew W. "Location-based services, conspicuous mobility, and the location-aware future." Geoforum 43.6 (2012): 1266-1275. (Year: 2012).
Tech Target, Definition of Personal Area Network, techtarget.com/definition/personal-area-network, (Year: 2024).

\* cited by examiner

1100

1200

PEER-TO-PEER PAYMENT PROCESSING

RELATED APPLICATIONS

This application is a continuation of U.S. patent application Ser. No. 17/448,574, titled "Peer-to-Peer Payment Processing," filed Sep. 23, 2021, which is a continuation of U.S. patent application Ser. No. 16/394,659, titled "Peer-to-Peer Payment Processing," filed Apr. 25, 2019, which is a continuation of U.S. patent application Ser. No. 15/172,032, titled "Peer-to-Peer Payment Processing," filed Jun. 2, 2016, which is a continuation of U.S. patent application Ser. No. 13/801,520, titled "Peer-to-Peer Payment Processing," filed Mar. 13, 2013, which claims the benefit of U.S. Provisional Patent Application No. 61/715,229, titled "Peer-To-Peer Payment Processing," filed Oct. 17, 2012, each of which is incorporated by reference in its entirety.

FIELD

Embodiments of the invention relate, generally, to facilitating payments via a mobile device.

BACKGROUND

Financial transactions between merchants and consumers typically require the consumers to present a form of payment to the merchant. As a result, consumers may be required to keep wallets that include cash, credit cards, debit cards, checks or other payment instruments that may be accepted by merchants and/or their devices used at the point-of-sale (e.g., point-of-sale devices, such as cash registers, credit card readers, etc.). In this regard, areas for improving current systems have been identified. Through applied effort, ingenuity, and innovation, solutions to improve such systems have been realized and are described in connection with embodiments of the present invention.

BRIEF SUMMARY

Systems, methods, and computer readable program code are provided to, in general, improve payment using a device. More specifically, embodiments provided herein may include a payment system that may be implemented to provide merchants (e.g., those that have "brick-and-mortar" retail space and/or online ordering storefronts and/or peers that receive payment) a way to receive payment from a consumer based on data sent (e.g., automatically, in some embodiments) by a consumer's machine and without the consumer having to present any payment account information or currency directly to the merchant (or peer).

Some embodiments may provide for a merchant (or peer) device that includes a display configured to present interactive displays, communications circuitry configured to facilitate communications with a consumer (or peer) device and a payment system, and processing circuitry. The processing circuitry may be configured to: wirelessly send a total cost to the consumer device; wirelessly receive consumer approval data for a payment secured with wallet identifying data from the consumer device; and send the consumer approval data secured with the wallet identifying data to the payment system.

In some embodiments, the wallet identifying data may be based at least partially on a random code generated by the payment system. The wallet identifying data may include one or more tokens and/or keys. Furthermore, the consumer approval data may include data that is encrypted, signed, or otherwise secured with the wallet identifying data.

In some embodiments, the processing circuitry of the merchant device may be further configured to: receive a payment confirmation indicating payment of the total cost from a payment account associated with the consumer device; and send a receipt indicating payment of the total cost to the consumer device.

In some embodiments, the processing circuitry of the merchant device may be further configured to receive, from the payment system, consumer identifying data associated with the wallet identifying data.

In some embodiments, the processing circuitry of the merchant device may be further configured to receive, from the payment system, consumer identifying data associated with the wallet identifying data.

In some embodiments, the processing circuitry of the merchant device may be further configured to: receive product identifying data, wherein price data is associated with the product identifying data; and determine the total cost based on the price data.

In some embodiments, the processing circuitry of the merchant device may be further configured to receive image data representing a picture of a consumer associated with the consumer device. For example, the image data may be received from the payment system in response the consumer device coming within communicable range with the merchant device. In some examples, the image data may be received prior to sending the total cost to the consumer device.

In some embodiments, the processing circuitry of the merchant device may be further configured to establish a connection with the consumer device via a personal area network. For example, the personal area network may be configured to communicate via one or more Bluetooth protocols. The merchant device may be further configured to wirelessly receive the consumer approval data secured with the wallet identifying data from the consumer device over the personal area network even when the merchant device and/or consumer device lacks Internet access and is unable to connect to the payment system Some embodiments may provide for a consumer (or peer) device that includes a display configured to present interactive displays, communications circuitry configured to facilitate communications with a merchant (or peer) device and a payment system, and processing circuitry. The processing circuitry may be configured to: receive wallet identifying data from the payment system; wirelessly receive a total cost from the merchant device; wirelessly send consumer approval data secured with the wallet identifying data to the second device; and receive a receipt indicating payment of the total cost from the payment processing system.

Some embodiments may provide for a payment system that includes a networked device (e.g., a payment server). The networked device may include communications circuitry configured to facilitate communications with a consumer device and a merchant device and processing circuitry. The processing circuitry may be configured to: send wallet identifying data to a consumer device; receive consumer approval data associated with a payment secured with the wallet identifying data from a merchant device; validate the consumer approval data received from the merchant device; and process the payment after validating the consumer approval data received from the merchant device.

In some embodiments, the processing circuitry of the networked device may be further configured to: receive consumer identifying data from the consumer device;

receive payment account information from the consumer device; and generate the wallet identifying data associated with the payment account information and the consumer identifying data. In some embodiments, the processing circuitry of the networked device may be further configured to generate random code and generate the wallet identifying data based at least partially on the random code. Some embodiments may include methods that may be computer-implemented by one or more of the machines discussed herein. Other embodiments may include one or more machines, such as an apparatus and/or system, configured to implement the methods and/or other functionality discussed herein. For example, the machine may include one or more processors and/or other machine components configured to implement the functionality discussed herein based on instructions and/or other data stored in memory and/or other non-transitory computer readable media.

These characteristics as well as additional features, functions, and details are described below. Similarly, corresponding and additional embodiments are also described below.

BRIEF DESCRIPTION OF THE DRAWINGS

Figure 1:
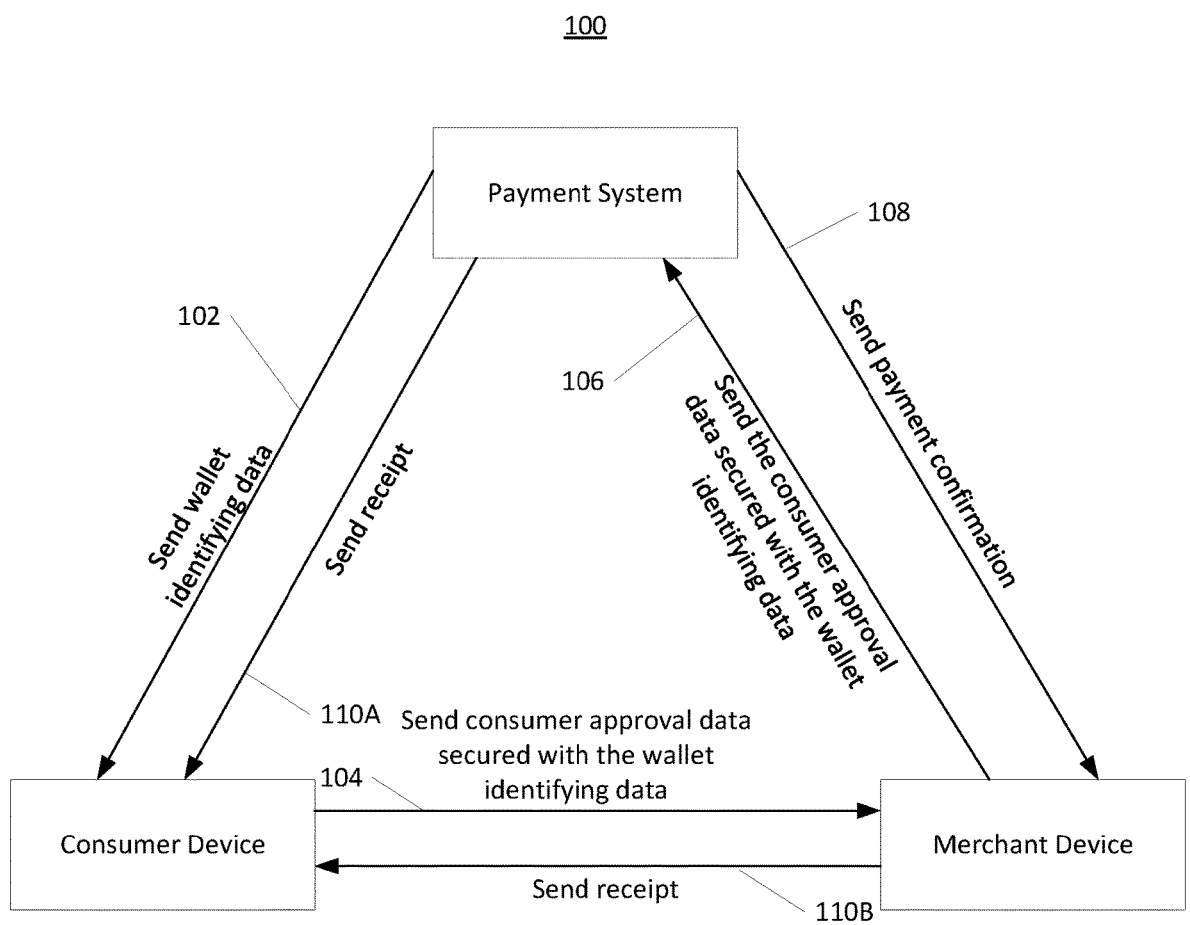
Figure 2A:
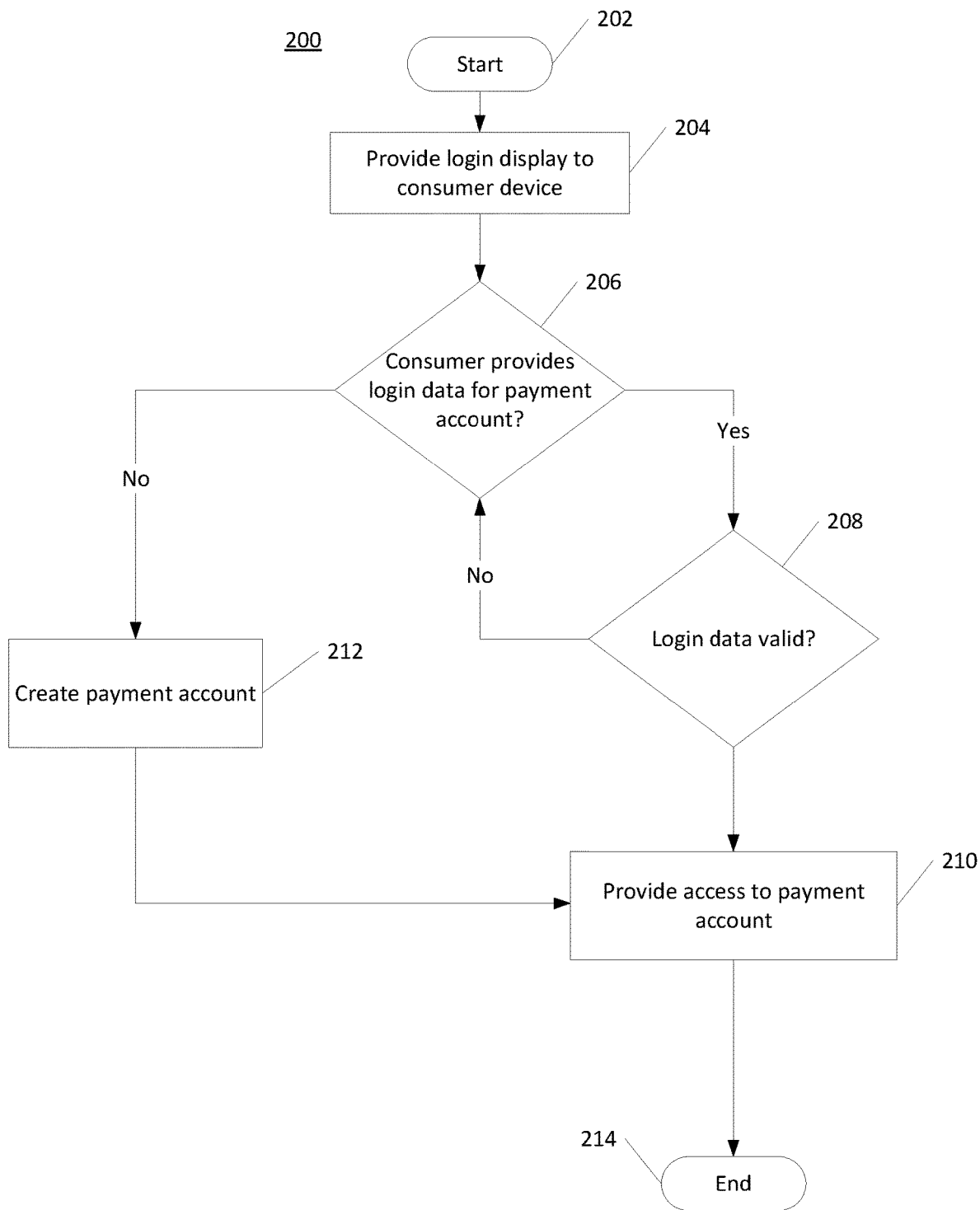
Figure 2B:
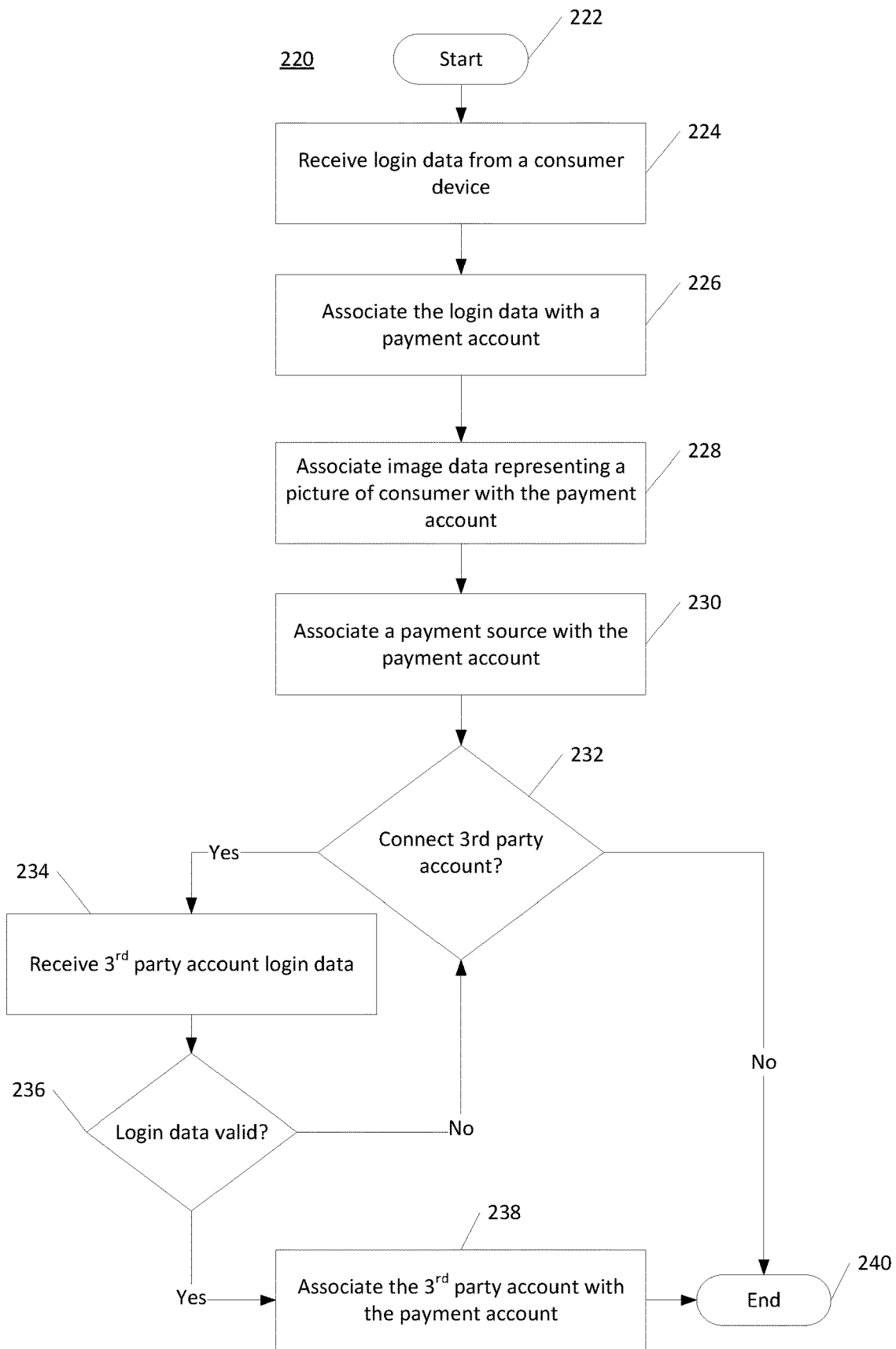
Figure 13:
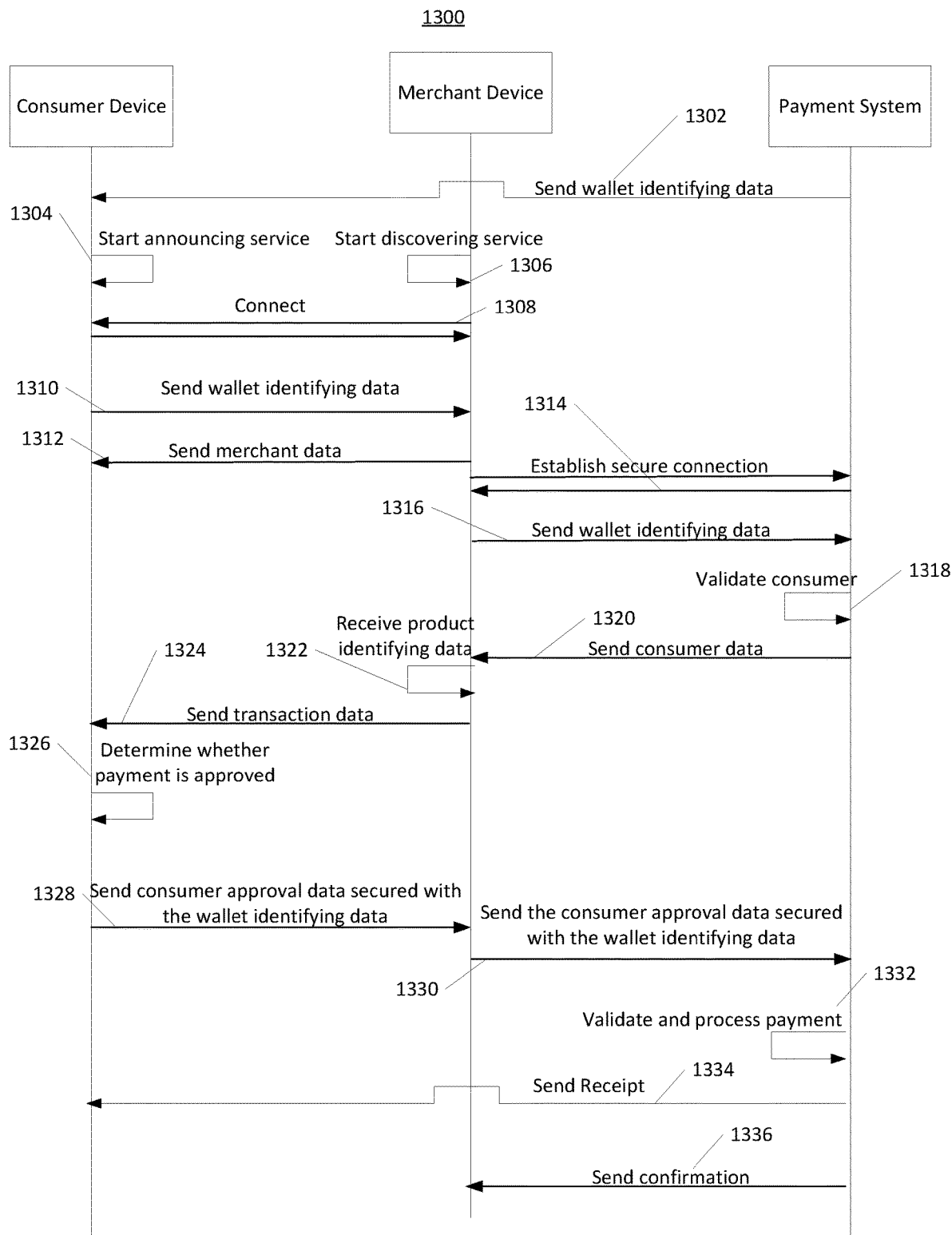
Figure 14:
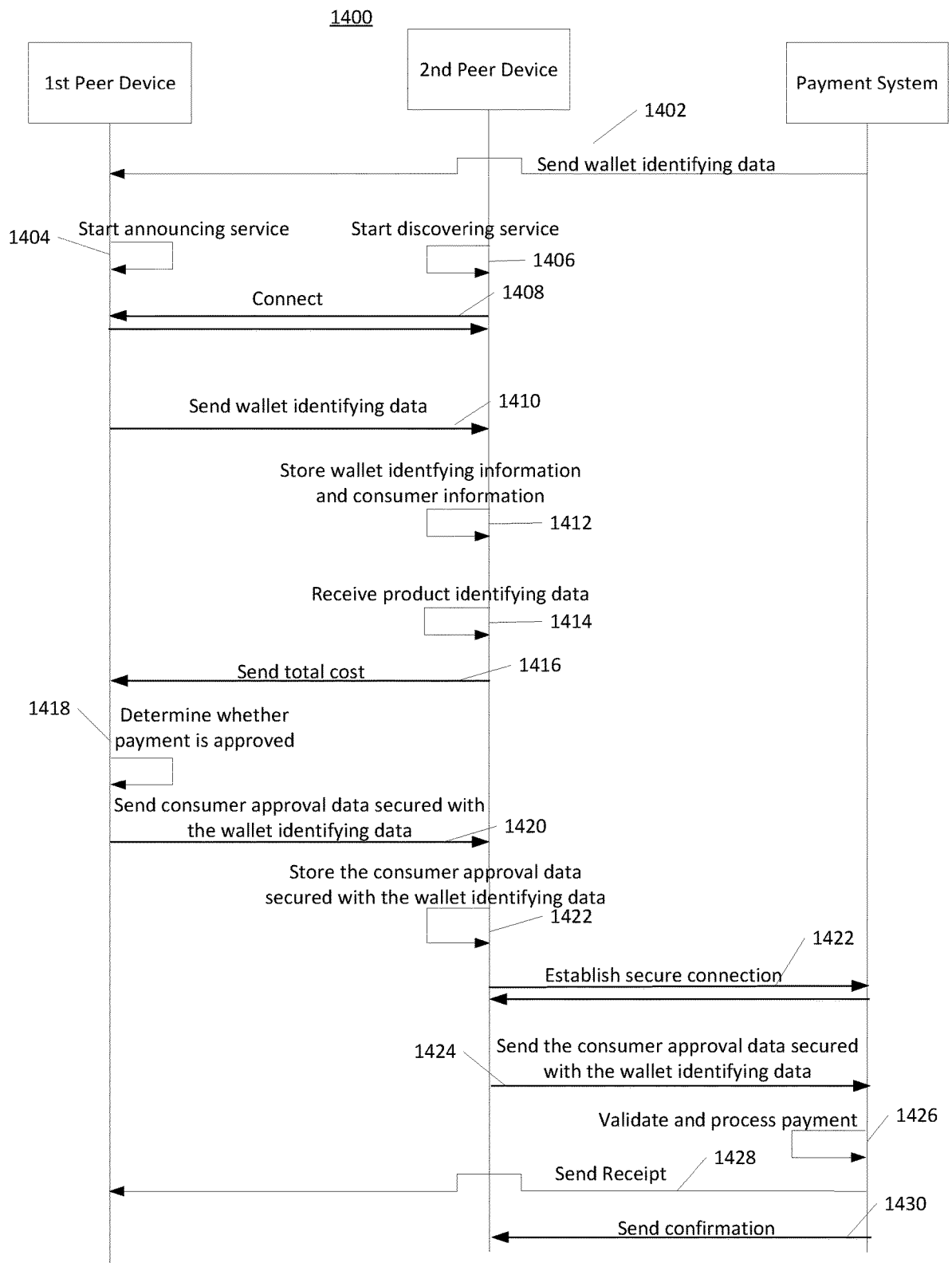
Figure 23:
Figure 24:
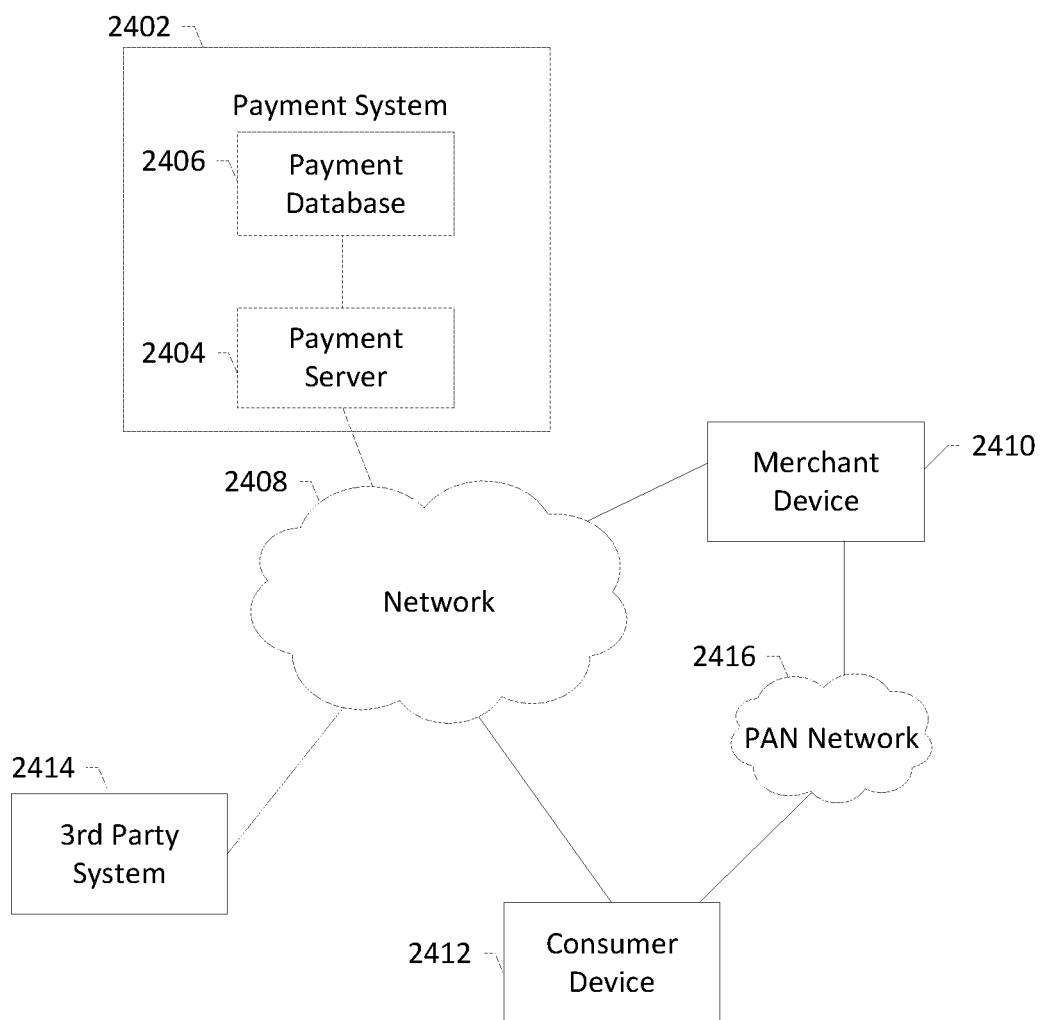

Having thus described some embodiments in general terms, reference will now be made to the accompanying drawings, which are not necessarily drawn to scale, and wherein:

FIG. 1 shows a flow chart of an example method for facilitating transactions, performed in accordance with some embodiments;

FIG. 2a shows a flow chart of an example method for accessing a payment account, performed in accordance with some embodiments;

FIG. 2b shows a flow chart of an example method for creating a payment account, performed in accordance with some embodiments;

FIGS. 3-12 show example graphical user interface displays that may be presented by various components of systems, in accordance with some embodiments;

FIGS. 13 and 14 show flow charts of example methods for facilitating transactions, performed in accordance with some embodiments;

FIGS. 15-22 show example graphical user interface displays that may be presented by various components of systems, in accordance with some embodiments;

FIG. 23 shows an example graphical user interface display that may be presented by various components of systems, in accordance with some embodiments;

FIG. 24 shows a flow chart of example methods for providing offers, performed in accordance with some embodiments.

Figure 25:
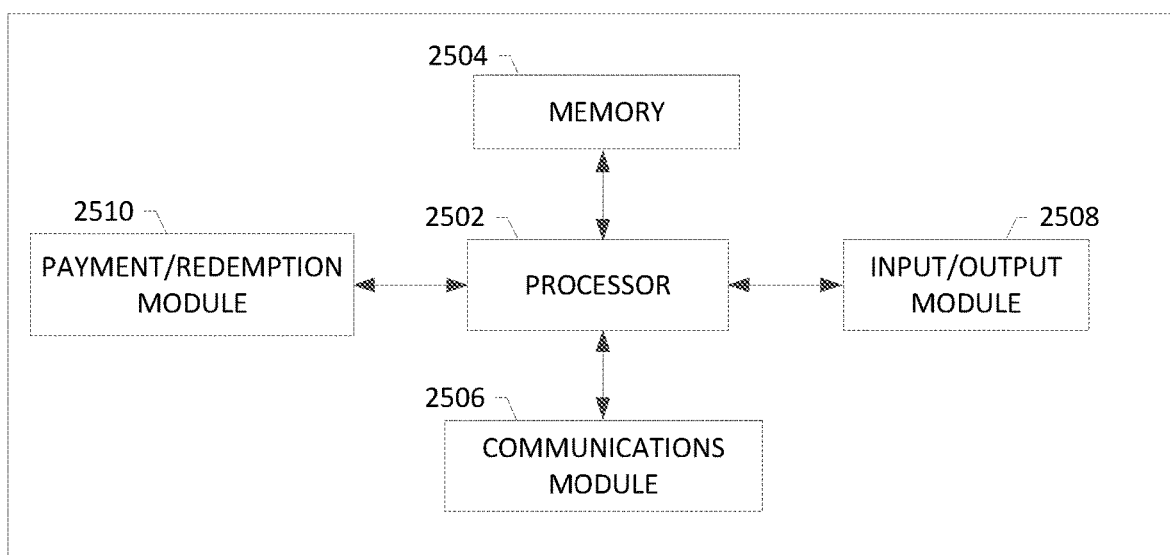

FIG. 24 shows an example system for providing payments and promotional offers, configured in accordance with some embodiments; and FIG. 25 shows an example schematic block diagram of circuitry, configured in accordance with some embodiments.

DETAILED DESCRIPTION

Embodiments now will be described more fully hereinafter with reference to the accompanying drawings, in which some, but not all embodiments are shown. Indeed, embodiments of the invention may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Embodiments discussed herein may be configured to provide payments via a mobile device (e.g., a consumer device). In this regard, some embodiments may free a consumer from having to carry any traditional payment instructions, such as credit cards, currency, checks, and/or other items typically stored in a physical wallet. Instead, the consumer may associate a payment account with the consumer device, such as a mobile phone, and make payments from the payment account simply by carrying and/or using the consumer device. For example, rather than hand a credit card and/or other tangible form of payment to a merchant or a peer (e.g., a second consumer or the like), the consumer device may be configured to provide (e.g., automatically and/or in response to receiving a user indication to do so) wallet identifying data that facilitates a payment of a certain amount to the merchant by a networked system.

Another advantage that may be realized by some embodiments discussed herein allows for secure payments, whether the payments are between a consumer device and a merchant device, two consumer devices or two merchant devices. As such, consumers and merchants may be protected from unauthorized devices and/or fraudulent payments.

Yet another advantage that may be realized by some embodiments discussed herein is that the consumer device and/or merchant device can be configured to facilitate a network-based payment without an active connection with the payment system (e.g., via the Internet) at the time of the transaction. For example, when a consumer device enters the vicinity of or is otherwise within communicable range (sometimes referred to herein as being "in proximity") with a compatible merchant (or peer) device, a connection (e.g., via a personal area network ("PAN")) may be automatically created. Despite the lack of an active connection to the payment system, the consumer device and/or merchant device may make secure payments by sharing the wallet identifying data via the connection. The wallet identifying data may be stored and later sent to the payment system for additional processing (e.g., to complete a financial transaction). Some other, but non-exhaustive, advantages that may be realized by some embodiments discussed herein include allowing a merchant/peer to ensure that the consumer device user is in fact the real person authenticated to the consumer device, allowing payments between two peer devices, providing promotional offerings (e.g., promotional vouchers, sales, discounts, rewards, or the like) to the consumer, and/or facilitating consumer service and point-of-sale functionality.

Facilitating Financial Transaction Overview

FIG. 1 shows a flow chart of an example method 100 for facilitating transactions, in accordance with some embodiments. Method 100 is meant to show a high level example, while some of the other processes flows discussed herein (such as those discussed in connection with FIGS. 13 and 14) show more detailed examples.

At 102, a payment system may be configured to send wallet identifying data to a consumer device. For example, a consumer may be associated with a payment account that is accessed via the consumer device. Upon accessing the payment account via the consumer device (e.g., providing login data), the payment system may send the wallet identifying data to the consumer device.

The wallet identifying data can comprise, for example, one or more keys, numbers, codes, and/or other types of tokens that are randomly or otherwise generated and/or assigned. "Random," as used herein, may include pseudo-random and/or random generation and assignment schemes. The wallet identifying data may be used to encrypt, sign, and/or otherwise secure messages. As such, private information such as consumer data, merchant data, financial data, transaction data, and/or other sensitive, non-random data may be secured with the wallet identifying data.

For example, the wallet identifying data may be random data associated with the more sensitive, less random data, and the wallet identifying data can be transmitted over at least some types of communication links (e.g., unsecured or less secured wireless networks or direct connections) instead of the more sensitive, less random data. In some embodiments, a recipient, such as an authorized merchant device, can be configured to receive the wallet identifying data, communicate the wallet identifying data to a payment processing system (which may be cloud-based), and receive the sensitive data securely (or at least more securely). For example, the wallet identifying data may provide the merchant device with access to consumer information via the payment system in some embodiments. In some embodiments, the wallet identifying data may include a wallet identifying token and a private key. The wallet identifying token may be configured to be passed to other devices (e.g., a consumer device, a merchant device, a central system, etc.) to validate or authenticate various types of data. For example, the wallet identifying token may be passed to the merchant device, where the merchant device may be configured to share the wallet identifying token with the payment system to receive consumer information.

The private key may be used by the central system to correlate a wallet identifying token with consumer identifying data and to validate and/or otherwise verify secured payment approval data such that the data may be relied upon as authentic and, thus, processed or otherwise used. The private key may be kept secret by the central system and/or securely shared with only devices (e.g., consumer devices) authorized to use wallet identifying tokens and private keys. In some embodiments, a wallet identifying token and a corresponding private key may be generated together and/or mathematically related such that determining the private key from the wallet identifying token (and vice versa) is very difficult, if not impossible, and extremely time consuming or prohibitively expensive.

After receiving the wallet identifying data at 102, the consumer may walk into a store while carrying the consumer device. The consumer device may be configured to connect with a merchant device, such as via a personal area network (e.g., using Bluetooth) when the consumer device comes within a communicable range to a merchant device. In some embodiments, the consumer device and the merchant device may communicate via the connection and perform payments without requiring that the consumer device have an active connection to the payment system (e.g., via the Internet). After picking out items for purchase, the consumer device may receive transaction data (which may include or be limited to, among other things, a total cost of the items) from the merchant device and/or from one or more input components coupled thereto (e.g., a barcode scanner, magnetic stripe reader, user keypad, touchscreen display, etc.).

The discussion herein regarding merchant devices may also be applicable to a peer device, such as a second consumer device. For example, the consumer device may be configured to connect with the second consumer device, such as via the PAN when the consumer device comes within a communicable range to the second consumer device. As such, a "merchant device," as used herein, may refer to a second consumer device that is configured to receive payments from the consumer device.

At 104, the consumer device may be configured to send consumer approval data with the wallet identifying data to the merchant device. The consumer approval data may indicate, among other things, that the consumer approves a payment as indicated by the transaction data. In embodiments where the wallet identifying data includes a private key, the consumer approval data may include transaction data that is signed or otherwise secured using the private key. As such, the consumer approval data may be secured with the wallet identifying data and sent to the merchant device.

In some embodiments, the consumer device may be configured to automatically send the consumer approval data automatically upon receiving the transaction data. For example, one or more merchants can be associated with a pre-approved list, a per-transaction cost threshold can be set for preapproval (e.g., all transactions under $20 can be automatically approved by the consumer device), a per-day cost threshold (e.g., up to $100 per day can be automatically approved), and/or any other variable(s).

At 106, the merchant device may be configured send the consumer approval data secured with the wallet identifying data to the payment system. In some embodiments, the merchant device may be further configured to generate secured payment approval data and to send the secured payment approval data to the payment system. The secured payment approval data may be a combination or other association of the consumer approval data and the transaction data. The payment system may use this information to determine whether to approve the payment by the consumer (e.g., via the payment account). In some embodiments, the payment system may be configured to validate the consumer approval data. For example, the payment system may be configured to compare the wallet identifying data received from the merchant device at 106 with the wallet identifying data sent to the consumer device at 102. If the payment system approves the payment, a payment confirmation may be sent to the merchant device at 108.

In some embodiments, the transaction receipt (e.g., information about the particular transaction) and/or other receipt information may be sent to the consumer device from the payment server at 110A. The other receipt information can include, for example, a remaining balance and/or purchase power after the instant transaction (e.g., the amount of money until the consumer's account reaches the applicable credit limit(s), the amount of money remaining in the consumer's debit account after the transaction is processed, etc.), total spend over a given period of time (e.g., the amount of money spent in an hour, day, week, etc. including the instant transaction), total spend at a given merchant and/or location (e.g., amount of money spent at the merchant over a period of time, amount of money spent in a city over a period of time, etc.), and/or any other purchase-related information that may be of interest to the consumer subsequent to a transaction (including information that may help identify fraud and/or improper use of the consumer's payment account).

In addition to or instead of the receipt being sent from the payment server to the consumer device at 110A, a transaction receipt and/or other receipt information may be sent to the consumer device from the merchant device at 110B. The receipt information sent from the merchant device can be the same as or different than that sent at 110A, and/or can be independent of or based on receipt information generated by the processing server. For example, the merchant device can be configured to send an independent receipt to the consumer device that the consumer can use to verify the receipt information sent from the payment processing system at 110A. For example, this may aid the consumer in confirming that the payment processing system actually charged the consumer's payment account the amount the merchant indicated was due for the goods/services purchased (and/or help the consumer identify a discrepancy between what was purchased and the amount actually charged by the payment processing system). As another example, the payment server may also or instead send receipt information to the merchant device, which may then send the receipt to the consumer device.

FIG. 2a shows a flow chart of an example method 200 for accessing a payment account, performed in accordance with some embodiments. Method 200 will be described with reference to example displays 300-1200 shown in FIGS. 3-12, respectively.

FIGS. 3-12 show example displays 300-1200 that may be presented by one or more display screens of one or more machines, such as those used by consumers, which are sometimes referred to herein as "consumer devices," in accordance with some embodiments discussed herein. For example, the displays may be presented to a consumer (e.g., a user that makes payments) by a mobile device and/or a stationary device. Example mobile devices may include a cellular telephone (including smart telephones and/or other types of mobile telephones), laptop, tablet, and/or the like. Additionally or alternatively, a consumer may access displays 300-1200 and 1400-2200 via a stationary device, such as a desktop computer, work station, POS device, and/or any other type of device. FIGS. 15-22 are additional example displays, namely displays 1500-2200, which may be presented by one or more display screens included in one or more consumer devices.

FIG. 23 shows an example display 2300 that may be presented by one or more display screens of one or more machines, such as those used by merchants, sometimes referred to herein as "merchant devices." Any number of staff members employed by a merchant may have access to merchant devices, and, as such, the term "merchant" is sometimes used herein to describe any user representing the merchant and/or any other person who receives payment from another person, namely the consumer. Like consumer devices, merchant devices may include stationary devices and/or mobile devices. Additional examples of merchant devices and consumer devices are discussed in connection with FIGS. 24 and 25.

In some embodiments, any physical device may be configured to perform the functionalities described herein with respect to both merchant devices and consumer devices. For example, a device may be configured to make a payment (e.g., like a consumer device) and also receive a payment (e.g., like a merchant device).

In some embodiments, the displays 300-1200, 1500-2200 and 2300 may be accessed via an application that executes locally and causes a merchant/consumer device to be configured to function as a specialized machine. Additionally or alternatively, cloud-based, multi-tenant, thin-client, and/or other types of online service techniques may be used. For example, the displays may be provided by one or more applications that execute on a remote device, such as a server and/or other networked machine. User input information may be generated by and sent from the merchant/consumer device to the remote device, while visual and/or audio information is sent from the remote device to the device.

Figure 3:
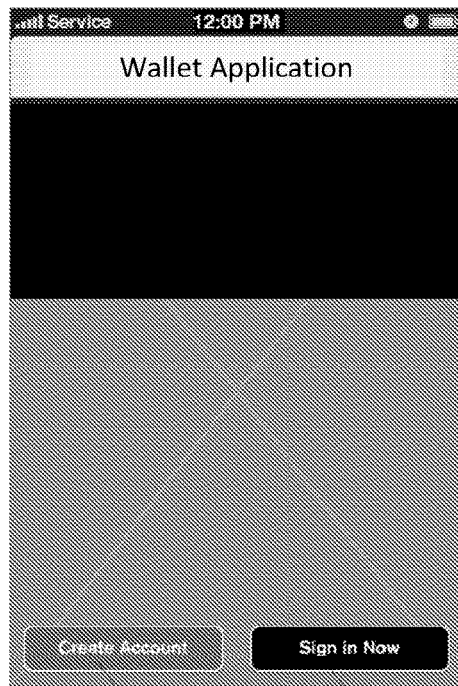

Turning back to FIG. 2a, method 200 shown therein may start at 202 and proceed to 204, where a payment system (e.g., payment server 2404 shown in FIG. 24) may provide a login display to a consumer device. For example, FIG. 3 shows login display 300 that may be displayed by/to a consumer device (e.g., consumer device 2412 shown in FIG. 24). Login display 300 may be accessed by virtually any method, such as an application executed by the consumer device. Alternatively and/or additionally, login display 300 may be accessed via a web browser, such as by entering an address (e.g., a uniform resource locator ("URL") address) into the web browser's location bar. Login display 300 may be configured to allow a user to create a payment account and/or sign in to a payment account. As such, login display 300 may include create account selection 302 and sign in selection 304.

Figure 4:
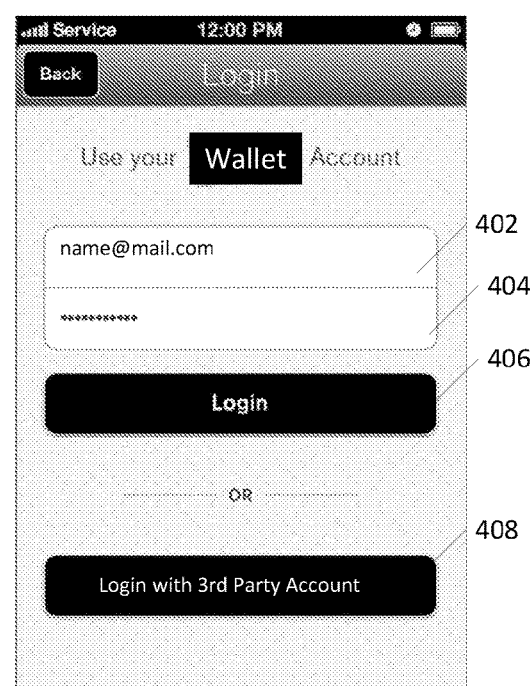

At 206, the payment system may be configured to determine whether the consumer has provided login data for the payment account. For example, the consumer may select sign-in selection 304 in login display 300 to indicate a desire to sign-in with a preexisting payment account. In response, the consumer device may be configured to accept login data (e.g., a username, password, biometric identifier, etc.) for the payment account. For example, login input display 400, as shown in FIG. 4, may be configured to accept the login data in some embodiments. The consumer may enter a username to username field 402, a password to password field 404, and submit the payment (e.g., to the one or more servers) by selecting login selection 406.

If the consumer provides login data at 206, method 200 may proceed to 208. At 208, the payment system may be configured to determine whether the login data is valid. For example, the login data received from the consumer device may be compared with login data stored in one or more databases (e.g., payment database 2402 shown in FIG. 24).

In some embodiments, the payment system may be configured to determine whether the consumer has provided third party login data for a third party account. For example, the consumer may select third party login selection 408 in login input display 400, which may allow the user to enter the third party login data (e.g., a username and password for the third party account).

The third party account may be any type of account that is provided by one or more third party servers (e.g., third party system 2412 shown in FIG. 24). As will be discussed in greater detail with respect to FIG. 2b, the consumer may associate one or more third party accounts with the payment account, allowing the consumer to access the payment account via the third party account (e.g., by logging in and/or otherwise authenticating with third party login data). Example third party accounts may include an email account, a social networking account, an account provided by a merchant, a banking account, etc.

If the consumer provides the third party login data, a determination may be made as to whether the third party login data is valid at 208. For example, the payment system may be configured to send the third party login data to an appropriate third party server/system (e.g., with a login request). The payment system may be further configured to receive an indication regarding whether the login data is valid or invalid in response. As such, some embodiments may allow the consumer to access the payment account via one or more different third party accounts and associated third party login data.

If the login data is determined to be valid at 208, method 200 may proceed to 210, where the payment system may be configured to provide access to the payment account. As will be discussed in greater detail, the consumer device may be configured to, among other things, make payments via the payment account, associate one or more payment sources with the payment account, and/or view receipts of payments after receiving access to the payment account.

If the login data is determined to be invalid at 208, method 200 may return to 206 where a determination may be made as to whether the consumer wants to make another attempt at providing login data for the payment account. In some embodiments, the payment account (e.g., as identified by username field 202) may be locked out after a certain number of unsuccessful login attempts.

Returning to 206, if the consumer does not provide login data, method 200 may proceed to 212. At 212, the payment system may be configured to allow the consumer to create a payment account. As discussed above, the consumer may select create account selection 302 at login display 300. Responsive to the selection, the payment system may be configured to provide interfaces (e.g., displays 500-1200 shown in FIGS. 5-12) to the consumer device for creating the payment account, which will be described in further detail with respect to example method 220 shown in FIG. 2b. After creating the payment account, the consumer device may be allowed to access the payment account using method 200. Method 200 may end at 214.

Figure 5:
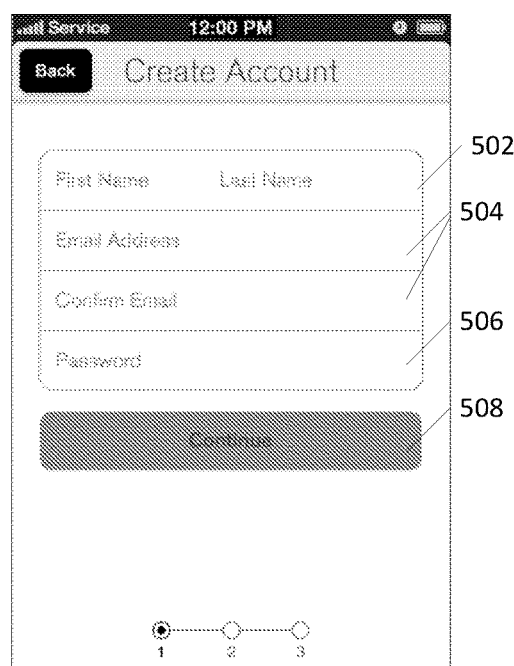
Figure 6:
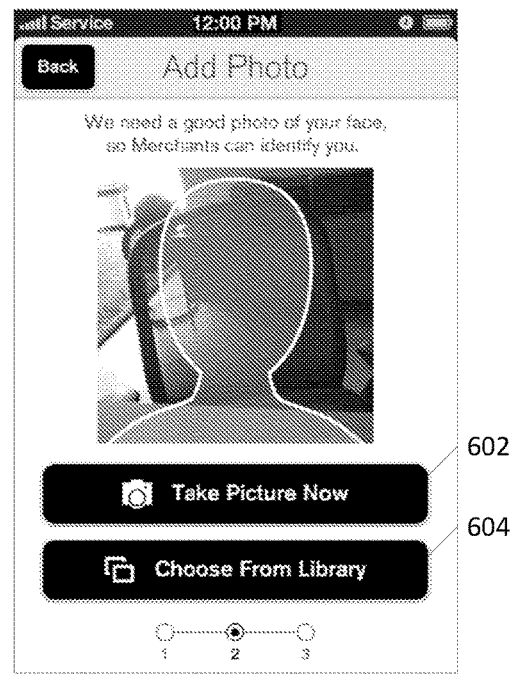

FIG. 2b shows a flow chart of an example of a method 220 for creating a payment account, performed in accordance with some embodiments. Method 220 may begin at 222 and proceed to 224, where login data (e.g., a username and password) for the payment account may be received from the consumer device. FIG. 5 shows an example create account display 500 that may be presented by the consumer device. Create account display 500 may include name field 502, email address fields 503, and password field 504. In some embodiments, an email address entered into email address fields 503 may be used as the username for the payment account (e.g., at username field 402, as shown in FIG. 4). Alternatively and/or additionally, the consumer may enter a username that is different from the email address that may be used for login. The consumer device may be configured to send the login data to the one or more servers responsive to the consumer selecting continue selection 508.

At 226, the login data received from the consumer device may be associated with a payment account. For example, associations between the login data may be stored in the one or more databases (e.g., payment database 2406 shown in FIG. 24). As such, the consumer may provide the login data to receive access to the payment account and/or associated data.

At 228, image data representing a picture of a consumer may be associated with the payment account. For example, the consumer device may be configured to display add photo display 600 responsive to the consumer selecting continue selection 508 in create account display 500. In some embodiments, the consumer device may include and/or otherwise be configured to control an image capturing device. The image capturing device may be any device configured to be able to capture the image data, such as a camera, a webcam, video recorder, etc. As such, the consumer device may be configured to allow the consumer to capture the image data by selecting take picture selection 602. Additionally and/or alternatively, the consumer may be allowed to choose existing image data (e.g., an image taken at an earlier time and stored) for association with the payment account, such as by selecting upload image selection 604.

Figure 7:
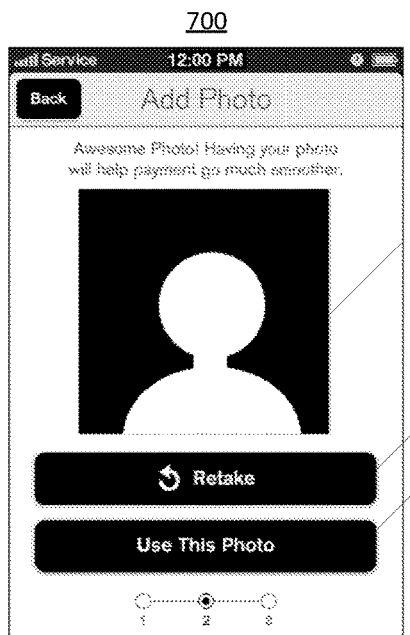

FIG. 7 shows an example confirm photo display 700 that may allow the consumer to review captured and/or existing image data, in accordance with some embodiments. For example, the image data may be shown at consumer image display 702. If the image data is unsatisfactory, the consumer may select retake selection 704. In some embodiments, the consumer device may be configured to display add photo display 600 in response. If the image data is satisfactory, the consumer may select use photo selection 706. The consumer device may be configured to send the image data to the one or more servers responsive to the selection.

Returning to FIG. 2b, at 230, the one or more servers may be configured to associate one or more payment sources with the payment account. In some embodiments, a payment source may be a financial payment account, such as a credit account, a checking account, a debit account, a third party payment account, a savings account, a bank account, or the like. In that sense, a "payment source," as used herein, may refer to any type of account capable of being associated with a currency balance (e.g., dollars, credits, etc.), providing a payment that decreases the balance, and/or receiving a payment that increases the balance.

Figure 8:
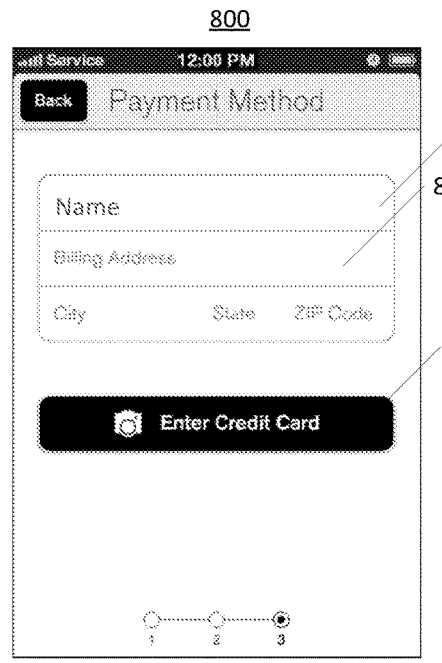
Figure 9:
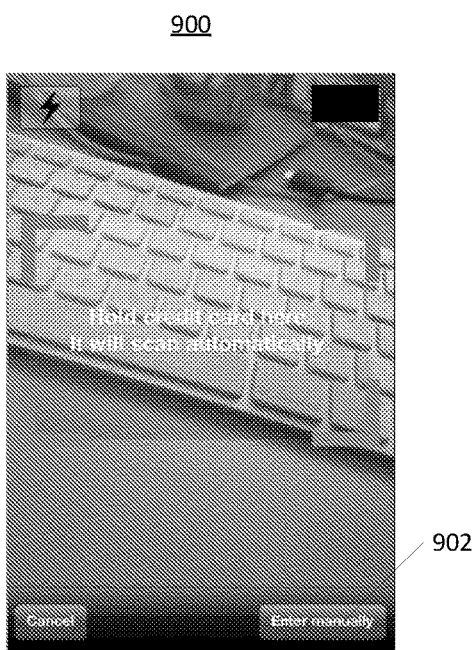

FIG. 8 shows an example add payment source display 800 that may allow the consumer device to send the one or more payment sources to the one or more servers, in accordance with some embodiments. The consumer may enter a name and billing address at 802 and 804, respectively. The consumer may further select enter credit card selection 806, which may allow the consumer to enter a credit card as a payment source. It is appreciated that credit cards and/or credit card account numbers are only an illustrative example, and that the techniques disclosed herein may be applicable to other types of payment sources, including checking account numbers, debit account numbers, savings account numbers, and/or any other account number that may have value and/or a value associated therewith to be used for payment.

Upon selecting enter credit card selection 804, the consumer device may be configured to allow a user to scan a credit card. For example, a consumer may hold a credit card to an image capturing device that may be configured to capture the credit card as image data, as shown in credit card capture display 900 in FIG. 9. The image data may be processed (e.g., using optical character recognition ("OCR") to extract a credit card number, expiration date and/or credit verification value (or "CVV"). One example of software that may provide credit card capturing and data extraction with a mobile device camera is card.io. It is appreciated, however, that any technique for reading credit card data may be used. For example, a barcode reader device that may read credit card data when the consumer swipes a credit card through the magnetic stripe reader device may be used in addition, or alternatively, to the image capturing device.

Figure 10:
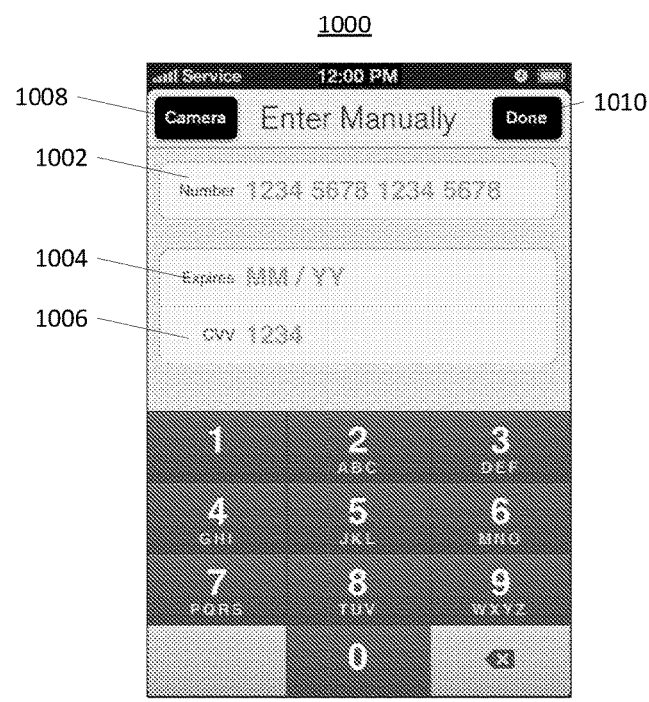

Additionally and/or alternatively, the consumer may select enter manually selection 902, which may cause the consumer device to display manual entry display 1000, as shown in FIG. 10. The consumer may enter a credit card number at 1002, the expiration date at 1004, and the CVV at 1006. In some embodiments, extracted credit card data from the image data may be used to automatically populate these fields, allowing a consumer to correct any mistakes (e.g., an OCR error). The consumer may return to credit card capture display 900 via camera selection 1008. The consumer may also submit the entered credit card data by selecting submit selection 1010.

Figure 11:
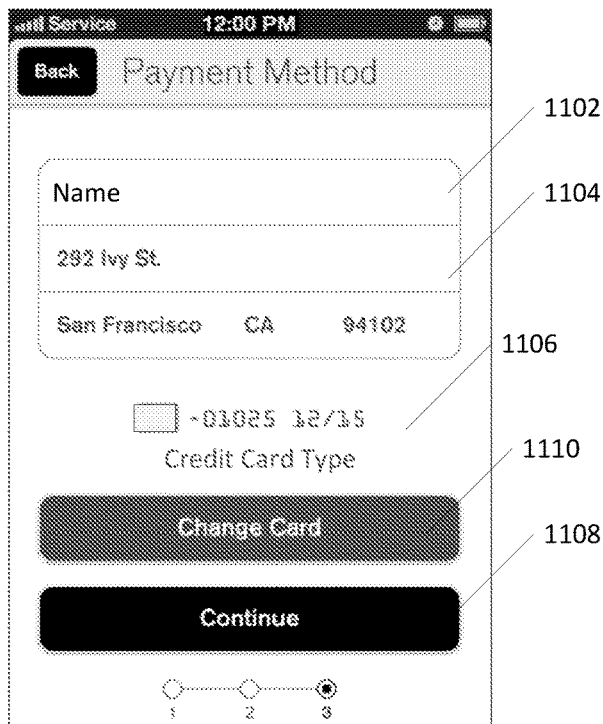
Figure 12:
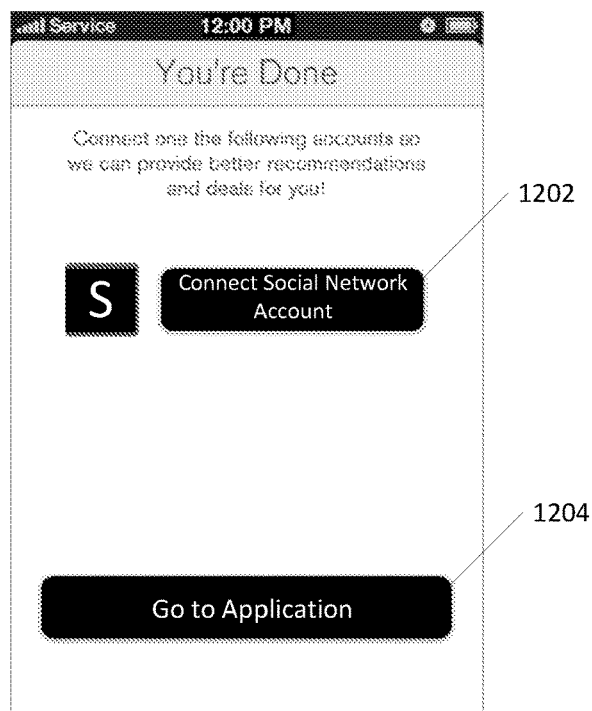

FIG. 11 shows an example confirm payment source display 1100, in accordance with some embodiments. Confirm payment source display 1100 may be shown, for example, after the payment system has validated the credit card data. The consumer may add a payment source and/or replace the credit card data with a different payment source, such as by selecting change card selection 1110. The consumer may also indicate that the name at 1102, billing address at 1104, and/or credit card data at 1106 is correct by selecting continue selection 1108.

Returning to FIG. 2b, at 232, the payment system may be configured to make a determination as to whether to associate one or more third party accounts to the payment account. In some embodiments, connecting a third party account may allow a user to login to the payment account via the third party account, as discussed above at 206 of method 200. Additionally and/or alternatively, third party account data (e.g., user profile, purchase history data, social network data, etc.) may be used to generate tailored recommendations for products, services, merchants, discounts, promotional vouchers, or the like that may be presented to the consumer device. For example, the consumer may use third party account connection display 300 associate a third party account (e.g., a social network account) by selecting connect account selection 1202.

At 234, the consumer device may be configured to prompt the consumer for third party login data, which may be received by the payment system. The payment system may be configured determine whether the login data is valid at 236, which may include contacting a third party system/server. If the login data is valid, method 220 may proceed to 238, where the third party account may be associated with the payment account. If the login data is invalid, method 220 may return to 232, to determine whether the user is still interested in connecting a third party account. If the consumer is not interested in associating a third party account with the payment account at 232, method 220 may end at 240. Returning to FIG. 12, the payment system may be configured to provide access to the payment account, associated data, and/or functionality responsive to the consumer selecting go to application selection 1204.

Payments Via Consumer Device

FIG. 13 shows a flow chart of an example data flow represented by method 1300, which can result in facilitating a payment and/or other transaction, performed in accordance with some embodiments. Method 1300 is described as being performed by a consumer device (e.g., consumer device 2412 shown in FIG. 24), a merchant device (e.g., merchant device 2410) and a payment system (e.g., one or more networked machines and/or payment server 2406). However, similar techniques may be applicable to payments between two peer devices (e.g., where a second consumer device acts like a merchant device as discussed herein).

In some embodiments, method 1300 may be performed after the consumer device has logged in or otherwise authenticated with the payment system to access a payment account. Method 200 for creating the payment account may be performed with a consumer device that is different from the devices that are configured to send payments as referenced in connection with methods 100, 1300 and 1400 of FIGS. 1, 13 and 14, respectively.

At 1302, the payment system may be configured to send wallet identifying data to the consumer device. As such, the consumer device may be configured to store the wallet identifying data. "Wallet identifying data," as discussed above, may refer to any type of data that may be used to secure data transfers between the consumer device and the merchant device while still enabling the consumer device to cause the merchant device to receive secure information about the consumer (and/or the consumer's payment account) from the payment system. For example, the wallet identifying may include, or may be based at least partially on, a random code generated by the payment system that is associated with the payment account of the consumer. In some embodiments, each piece of wallet identifying data sent to the consumer device at 1302 may include a wallet identifying token and an associated private key.

In some embodiments, some or all of the messages sent by the consumer device to the merchant device may be encrypted with and/or be signed with the wallet identifying data. The wallet identifying data and/or messages encrypted with wallet identifying data, if intercepted or otherwise downloaded by an unauthorized device, will not reveal consumer data, merchant data, financial information, and/or content of messages in some embodiments. Furthermore, messages that are signed with the wallet identifying data (e.g., the wallet identifying data, such as the private key, is appended or otherwise included with the message) may be used to identify the message sender and/or to authenticate the message sender (e.g., to prove that the sender is the identified correctly). In some embodiments, some or all of the messages sent by the merchant device to the consumer device may be encrypted and/or signed with merchant identifying data. Merchant identifying data may include, or may be based at least partially on, a random code generated by the payment system that is associated with an account (e.g., a payment account, bank account, credit card account, savings account, etc.) of the merchant.

In some embodiments, the wallet identifying data may be used for sending consumer data, identifying the payment account associated with the consumer device, signing messages by the consumer device that demonstrate consumer consent (e.g., for a payment) and/or proving the authenticity of the message, and/or encrypting messages to ensure that the messages remain secure. The wallet identifying data may in some example embodiments include one or more tokens generated by the payment system. Furthermore, the wallet identifying data may be sent to the consumer device at virtually any time. For example, wallet identifying data may be sent to a consumer device when the consumer creates a payment account via the consumer device, logs in to the payment account via the consumer device, on a scheduled basis (e.g., each day, each hour, each month, etc.), in the course of a transaction, or the like.

At 1304-1308, the consumer device and the merchant device may be configured to form a connection. In some embodiments, the connection may be formed without the consumer device and/or the merchant device having active Internet access at the time of the connection (e.g., an active connection to the one or more public servers). For example, the connection may be a wireless connection over a personal area network (e.g., via PAN network 2416 shown in FIG. 24). Some suitable personal area network protocols may include Bluetooth, Infrared Data Association (irDA), wireless USB, ZigBee, WiFi, and Z-Wave. It is appreciated, however, that any other type of connection between the consumer device and merchant device, such as direct wire, Internet, near field communications and/or radio frequency identification technologies, may be used.

Figure 15:
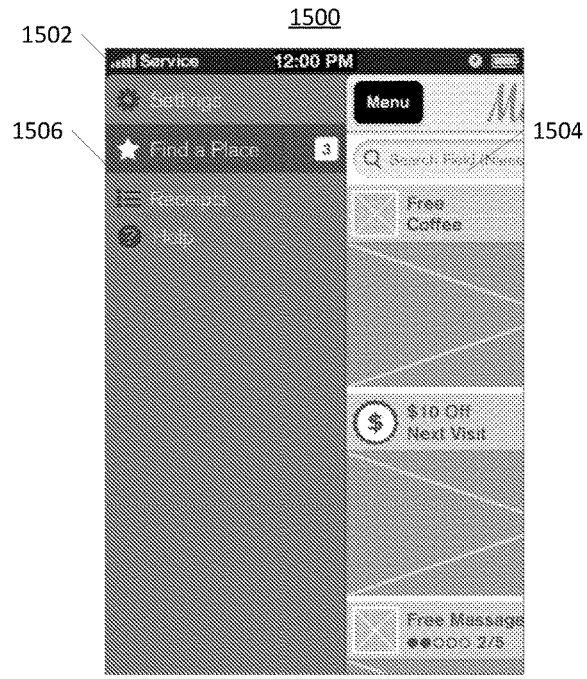

Depending on the protocol used, at 1304, the consumer device may begin announcing a payment service to other devices, such as the merchant device. For example, a process and/or application may execute on and configure the consumer device to broadcast (e.g., via Bluetooth) one or more suitable messages. FIG. 15 shows an example payment service menu display 1500 that may be displayed on the consumer device. The consumer may use settings selection 1502 to enable or disable the announcing of the payment service.

In some embodiments, the payment service may include one or more background processes that may run while the consumer device is locked, in a low-power mode, and/or executing other applications in the foreground. In some embodiments, the one or more broadcasted messages may include the wallet identifying data and/or be encrypted using the wallet identifying data.

At 1306, the merchant device may begin discovering the payment service. For example, a process and/or application may execute on the merchant device that configures the merchant device to discover other devices, such as the consumer device, that are currently announcing the payment service.

In some embodiments, the consumer device may be configured to discover the payment service while the merchant device may be configured to announce the payment service. Additionally and/or alternatively, both devices may be configured to be capable of announcing and discovering the payment service. For example, both devices may discover compatible devices and/or be discovered by compatible devices.

At 1308, a connection between the merchant device and the consumer device may be created. For example, the consumer device and merchant device may come within a certain discovery range (e.g., 10 meters for Bluetooth), such as when a consumer carrying the consumer device enters the merchant's shop. In some embodiments, the discovery range may be set by the merchant device and/or the consumer device and/or by the range at which the devices can be located from each other and still be able to communicate (such as when Bluetooth and/or other direct connect wireless technology is used).

In some embodiments, some or all of the messages used to form the connection between the consumer device and the merchant device at 1304-1308 may be encrypted and/or signed. For example, messages sent from the consumer device may be encrypted and/or signed with the wallet identifying data. Additionally and/or alternatively, messages sent from the merchant device may be encrypted and/or signed with merchant identifying data.

At 1310, the consumer device may send the wallet identifying data to the merchant device. In some embodiments, the consumer device may send the consumer's name, URL for accessing the image data representing a picture of the consumer (e.g., as associated with the payment account at 210 of method 200), the image data itself, and/or other suitable consumer identification information. As discussed above, the wallet identifying data may include a wallet identifying token. For example, at least one of the wallet identifying tokens that the consumer devices received from the payment system at 1302 may be sent to the merchant device at 1310.

In some embodiments, the wallet identifying data may include and/or provide a reference to consumer data stored in the one or more databases. As such, the wallet identifying data may be sent to the merchant device in place of actual consumer data that may be readily stolen by an unauthorized device. In some embodiments, the consumer device may send the consumer's name, the image data (or URL) and/or a payment account identifier (e.g., as used by payment system 2402) to the merchant device without including and/or using any wallet identifying data at 1310.

Figure 16:
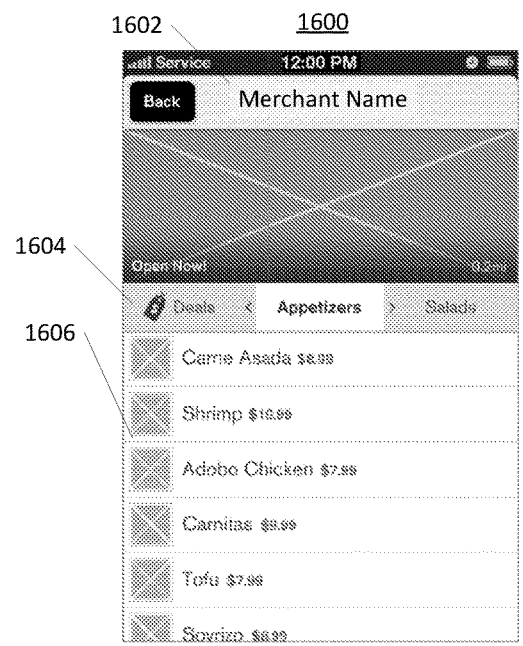

At 1312, the merchant device may send merchant data to the consumer device. For example, the merchant data may include merchant identifying data, or other data, that indicates the merchant's identity to the consumer device. The merchant data may further include information about the merchant, such as items for sale (e.g., products, services, etc.), promotional offerings, sales, etc. FIG. 16 shows an example merchant main display 1600, in accordance with some embodiments. Merchant main display 1600 may be shown on the consumer device at 1312 and may include the merchant data, such as merchant name at 1602, deals at 1604, and items at 1606.

Additionally and/or alternatively, the consumer device may access merchant main display 1600 and/or its data via the payment system. For example, some or all of the merchant data may be stored in payment database 2402 and provided to consumer device 2412 via payment server 2406 and network 2408, as shown in FIG. 24. A consumer may search and/or browse a list for merchants (e.g., using search field 1504 of payment service menu display 1500). Upon selecting a particular merchant, a merchant main display 1600 for the merchant may be shown on the consumer device.

In some embodiments, the merchant data sent from the merchant device at 1312 may include identification data but no additional merchant information. As such, the consumer device may be configured to request the additional information from the payment system based on the identification data.

At 1314, the merchant device may be configured to establish a secure connection with the payment system (e.g., via network 2408 shown in FIG. 24). For example, a merchant may provide login data to the payment system that may be used to identify and authenticate the merchant. The discussion above regarding payment accounts for consumers may be applicable to merchant accounts. In that sense, displays may be provided to a merchant device for accessing, managing and/or creating a payment account configured to receive payments. The secure connection with the payment system may be established at any suitable time, such as before the merchant device has connected with the consumer device at 1308. For example, the merchant device may include an Internet connection to the payment system that is active in the course of merchant device operation.

At 1316, the merchant device may be configured to send the wallet identifying data received from the consumer device at 1310 to the payment system. For example, the wallet identifying data may be sent via the secure connection established at 1314. As discussed above, the wallet identifying data may include data that identifies the consumer and/or the payment account associated with the consumer. In some embodiments, the wallet identifying data may be a wallet identifying token. Here, the associated private key is not sent with the wallet identifying token.

At 1318, the payment system may be configured to validate the consumer, such as by using the wallet identifying data. For example, the payment system may determine whether the wallet identifying data sent to the consumer device at 1302 matches or otherwise corresponds with the wallet identifying data received from the merchant device at 1316. For example, the payment system may ensure that the wallet identifying data received from the merchant device at 1316 originated from the consumer device (e.g., at 1310) that is authorized to use the payment account. Additionally and/or alternatively, the payment system may further be configured to extract some or all of the consumer information (e.g., the consumer's identity) from the wallet identifying data (e.g., by using a private key that correspond with a wallet identifying token).

At 1320, the payment system may be configured to send consumer information and/or other types of consumer identifying data to the merchant device. In some embodiments, the consumer information may be stored in one or more databases (e.g., payment database 2402). The payment system may be configured to request the consumer information based on the wallet identifying data received from the merchant device at 1316. The consumer information may include, for example, image data representing a picture of the consumer, payment account data, third party account data, purchase history data, user profile data, social network data, consumer preference data, etc.

FIG. 23 shows an example consumer information display 2300 that may be shown on the merchant device, in accordance with some embodiments. Consumer information display 2300 may be configured to notify the merchant that a compatible consumer device has been discovered and connected (e.g., at 1304-1308 of method 1300), to provide information about consumers for facilitating customer service, and/or to provide point-of-sale (POS) functionality. In some embodiments, a notification may also be shown on the merchant device at 1308 to indicate that a consumer has entered the vicinity of the merchant device (e.g., entered into communicable range) and/or merchant shop.

Consumer entry 2302 may include a display of consumer name at 2304, consumer image at 2306, recommended/favorite items at 2308, preference information at 2310, visit count at 2312, and/or promotional deals/rewards at 2314. Virtually any consumer information associated with the payment account may be shown in consumer information display 2300. In some embodiments, the consumer device may be configured to allow the consumer to set what consumer information is available to the merchant. Additionally and/or alternatively, the merchant device may be configured to allow the merchant to set the types of consumer information that is shown in consumer information display 2300.

In some embodiments, consumers may be listed in consumer information display 2300 based on the proximity of consumer devices to the merchant device. Consumers that are associated with consumer devices that are closer to the merchant device, for example, may be shown near the top of consumer information display 2300, or may otherwise be more readily accessible via consumer information display 2300, than consumers associated with consumer devices that are further from the merchant device. For example, consumer devices may further include location tracking and/or location sharing capability. For example, the merchant device can be configured to enable the merchant to show and/or hide various consumer information based on the proximity of the consumer device to the merchant device (using, e.g., real time locating system functionality, received signal strength indication, travel-time locating, and/or any other suitable proximity determining functionality).

At 1322, the merchant device may be configured to receive product identifying data for one or more items (e.g., products, services, etc.). The product identifying data may further include price data for the one or more items. For example, the merchant may select a consumer from consumer information display 2300, which may allow the merchant to associate the one or more items with the consumer to generate a shopping list. As will be discussed below in greater detail, the merchant device may be a point-of-sale (POS) device that is configured to receive the product identifying data. As such, the items may be entered to the merchant device in any suitable way including via barcode scan, radio-frequency identification (RFID), merchant input via a selectable menu, etc.

At 1324, the merchant device may be configured to send a total cost for the one or more items to the consumer device. As such, the merchant device may be further configured to generate a total cost for the one or more items. For example, the merchant device may be configured to generate a sum based on the price data for each item. The merchant device may also add costs (e.g., service costs, tips, taxes, warranties, or the like) and/or deduct costs (e.g., deal vouchers, rewards, discounts, sales, store credits, promotions, etc.) from the sum to generate the total cost. The total cost, as well as the product identifying data, may then be sent to the consumer device for payment approval at 1324. In some embodiments, the total cost may be part of transaction data that also includes a transaction ID (a unique number or code generated by the merchant device for each transaction) and/or a merchant ID (a unique number or code associated with each merchant or peer), In some embodiments, the merchant device may be configured to allow entry of the total cost. For example, rather than receiving the product identifying data and determining a total cost, the merchant device may allow the merchant to simply enter a total cost and send the total cost to the consumer device at 1324.

In some embodiments, the merchant device may be configured to allow the merchant to select from a plurality of payment types. For example, the merchant may ask the consumer how the consumer would like to pay. The consumer may decide, for example, to pay by cash, credit card, or otherwise without using the consumer device. As such, the merchant device may be configured to accept alternative forms of payment. If the consumer decides to pay via the consumer device, the merchant may so indicate by selecting a selection on the merchant device, which may cause the merchant device to send the total cost to the consumer device at 1324.

Additionally and/or alternatively, the one or more items may be entered by the consumer device. For example, a consumer may browse the merchant's shop and scan items (e.g., via an image capturing device, barcode scanner, etc.) using the consumer device to build the shopping list. In some embodiments, the consumer device may be configured to allow the consumer to create the shopping list via the Internet (e.g., online shopping via merchant main display 1600), at the merchant via the consumer device, and/or at locations remote from the merchant. The consumer device may then send the one or more items in the shopping to the merchant device and receive the total cost in response. Alternatively and/or additionally, the consumer device may be configured to calculate the total cost.

In some embodiments, the consumer device may be configured to include a location tracking device and/or otherwise make its location known to the merchant device and/or the payment system (e.g., payment server 2406, a promotional server, etc.) while the consumer is in the merchant's shop. Advertisements, sales, promotions, or the like may be sent to the consumer device based on its location. For example, when the consumer device is browsing in a section for refrigerators, one or more offers related to refrigerators may be provided to the consumer device. In addition to offers, the consumer device may be configured to request assistance and/or information regarding potential purchases.

Figure 17:
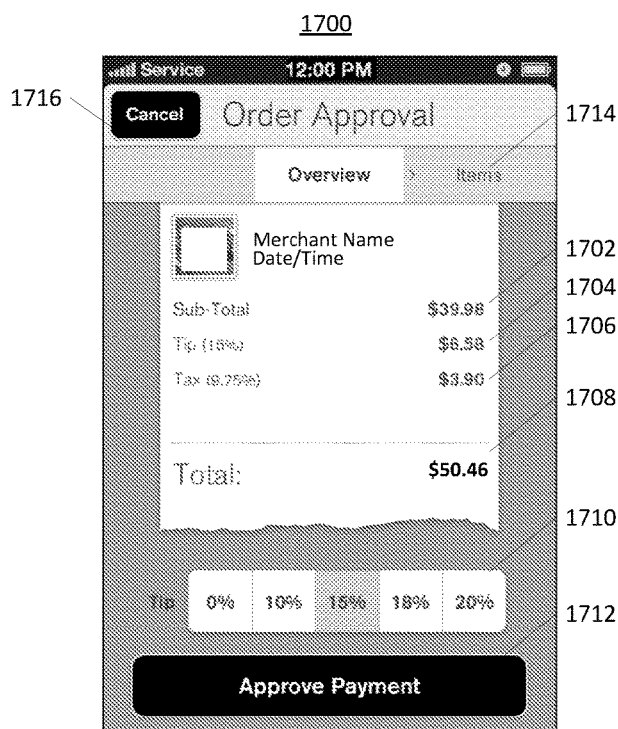

At 1326, the consumer device may be configured to determine whether to approve payment. In some embodiments, approving the payment may include generating an indication of approval. FIG. 17 shows an example order approval display 1700 that may be shown on the consumer device. Order approval display 1700 may include sub-total display 1702, tip display 1704, tax display 1706 and total amount display 1708. Furthermore, the consumer may select shopping list selection 1714 to view a listing of items (e.g., the one or more items whose price data provides a basis for the sub-total).

In some embodiments, the consumer device may be configured to allow the consumer to select a tip amount. For example, the consumer may select a tip percentage using tip selection 1710. Responsive to a tip selection, tip display 1706 and total amount display 1708 may be updated to reflect the new tip and total amounts. In some embodiments, the consumer device may allow the consumer to enter a tip amount. As such, a consumer may tip a merchant for service regardless of whether the consumer makes a purchase. For example, a consumer may browse goods at a store and make the purchase online. If the consumer received assistance from a merchant, the consumer may send a tip amount via the consumer device for the service. Furthermore, if the consumer has associated a plurality of payment sources with the payment account, the consumer device may further be configured to allow the consumer to select a particular payment source.

If the consumer is satisfied with the payment, the consumer may select approve payment selection 1712. In some embodiments, selecting approval payment selection 1712 may indicate approval of the payment. Additionally and/or alternatively, the consumer device may allow the user to provide an additional indication of consent. For example, the consumer may be prompted to select a box (e.g., a checkbox that indicates consent), provide login data, generate a signature (e.g., via a touch sensitive device such as a touch sensor), enter a pin number, and/or provide a biometric identifier (e.g., a fingerprint, voice message, retina scan, behavioral identifier, etc.). If the consumer is not satisfied with the total amount or otherwise does not approve of the payment, the consumer may select cancel order selection 1716.

Returning to FIG. 13, the consumer device may be configured to send consumer approval data secured with wallet identifying data to the merchant device at 1328. The consumer approval data may provide an indication as to whether the consumer has approved the payment. As discussed above, some or all of the messages sent from the consumer device may be signed and/or encrypted with the wallet identifying data. For example, the consumer approval data may be sent to the merchant device with the wallet identifying data (e.g., as a signature) and/or be encrypted using the wallet identifying data.

In some embodiments, the consumer approval data may include one or more messages that may include consumer data (e.g., consumer name, payment source information, payment account identification, etc.), transaction data (e.g., total amount, time of transaction, location, etc.), and/or the additional indication of consent. For example, a message may be formatted with JavaScript Object Notation (JSON), where each piece of data is associated with a field. In one embodiment, the consumer approval data may consist of an electronic signature created by appending a private key to a data string representing the transaction data and then performing an algorithmic transformation, such as a one way hash of the private key appended data string (e.g., using a cryptographic hash functions such as SHA-1).

In some embodiments, a message (hashed, signed, or otherwise) may be encrypted using the wallet identifying data. The encrypted message may also be stored in the message (e.g., in a field within the JSON format) itself. Additionally and/or alternatively, the message may be signed using the wallet identifying data (e.g., a private key may be is included in the message, such as in a field within the JSON format) and then encrypted. As such, the consumer approval data may further include the wallet identifying data that the consumer device received from the payment server at 1302.

In some embodiments, the wallet identifying data used at 1328 may include a different wallet identifying token and/or private key than those used at 1310 and, in some embodiments, the wallet identifying data used at 1328 may include the same wallet identifying token and/or private key used at 1310. In other embodiments, the payment system may send wallet identifying data that includes a wallet identifying token and an associated private key to the consumer device at 1302. As such, the wallet identifying token may be used at 1310 and the private key may be used at 1328. In some embodiments, each wallet identifying token and/or private key may only be used one time (or for only a limited time), thus the payment system may be able to identify potential security problems when a single wallet identifying token and/or private key is used in two different messages and/or payments.

In some embodiments, the consumer device may be configured to automatically approve the payment based on satisfaction of one or more trigger conditions. The consumer device may be configured to send the approval/disapproval data and/or wallet identifying to the merchant device upon satisfaction of the one or more trigger conditions. For example, the consumer device may allow the consumer to automatically approve payments (e.g., without using order approval display 1700).

In some embodiments, the identity of the merchant may serve as a trigger condition for automatic payment. For example, the consumer may be allowed to add one or more merchants to an approved merchant list. The consumer device may be configured to automatically send the approval/disapproval data and/or wallet identifying data to the merchant device if the merchant device is associated with a merchant from the approved merchant list. The merchant list may be stored on the consumer device and/or provided to the consumer device via the one or more servers. In some embodiments, the consumer device may be configured use the merchant data received from the merchant device at 1312 to determine whether the merchant is on the approved merchant list.

In some embodiments, the location of the consumer device may serve as a trigger condition for automatic payment. For example, the consumer device may be configured allow the consumer to generate the shopping list (e.g., by scanning items with the consumer device and/or via the merchant) and simply walk out of the store. The location of the consumer device may be tracked such that the approval/disapproval data and/or wallet identifying data are sent to the merchant device at 1328 when the consumer leaves the merchant, is a certain distance from a merchant device, etc.

In some embodiments, the reception of the total cost by the consumer device at 1324 may serve as a trigger condition for automatic payment. For example, the consumer device may be configured to send the approval/disapproval data and/or wallet identifying data immediately when the total cost is received from the merchant device. It is appreciated that combinations of one or more trigger conditions may be used. For example, the consumer device may be configured to send the approval/disapproval data and/or wallet identifying data to only merchants on the approved merchant list upon receiving the total cost.

In some embodiments, the reception of the total cost at 1324 may also serve trigger the consumer device to determine whether to provide the automatic payment. For example, the consumer device may be configured to determine whether the one or more trigger conditions are satisfied based on information received from the merchant device (e.g., at 1312 and/or 1324).

Other example trigger conditions may include merchant location, merchant type (e.g., retailers, restaurants, etc.), the total cost amount (e.g., automatically approve payments below a specified amount), etc.

In some embodiments, the consumer may be allowed to set automatic approvals on or off. Additionally and/or alternatively, a consumer may specify that only certain types of transactions require approval. In another example, approval for an initial purchase may be required at each merchant, but not for subsequent purchases. Similarly, an approved merchant may be removed or otherwise set such that the next and/or every transaction with the merchant needs to be approved.

In some embodiments, the merchant device may be configured to not allow automatic payment approval based on one or more trigger conditions. For example, the merchant device may specify that payments above a certain threshold amount require manual approval.

At 1330, the merchant device may be configured to send the consumer approval data secured with the wallet identifying data to the payment system. In some embodiments, the consumer approval data sent by the consumer device at 1328 may be sent to the payment server without any substantial processing and/or decoding by the merchant device. As such, the payment system may be configured to provide a payment service to the merchant device to facilitate financial transactions (e.g., process payments from the consumer's payment account to a merchant's payment account and/or other financial account). In some embodiments, only approved payments are sent to the payment system. In some embodiments, the merchant may be able to require consumer approval either at all times or based on various conditions. For example, the merchant may set a value that requires consumer approval for payments above the set value.

In some embodiments, the merchant device may be configured to generate secure payment approval data based on the consumer approval data and send the secure payment approval data to the merchant device. The secure payment approval data may include the consumer approval data and the transaction data (e.g., as may be modified by the consumer at 1418, such as to add a tip amount to the total cost).

At 1332, the payment system may be configured to validate and/or process the payment. For example, the payment system may process the wallet identifying data to decode and/or otherwise authenticate the consumer data, transaction data, and/or the indication of consent sent from the merchant device. Furthermore, the payment system may determine the payment account, payment source, total amount, or the like based on the received and/or extracted transaction data.

In some embodiments, where the consumer approval data consists of an electronic signature created by appending a private key to a data string representing the transaction data and then performing an algorithmic transformation, such as a one way hash of the private key appended data string, the payment system may be configured to validate the payment by recreating the electronic signature based on the transaction data. For example, the transaction data and the consumer approval data may be received from the merchant device. Next, the central system may append the private key (e.g., as stored in the payment system) to the transaction data and perform the same algorithmic transformation to recreate the consumer approval data. If the recreated consumer approval data matches the received consumer approval data, the payment may be validated.

In some embodiments, processing the payment may further include communicating with one or more third party servers, such as credit card servers, bank account servers, and/or any other type of financial server that may be suitable to help complete the financial transaction. For example, the payment server may send some or all of the transaction data to the one or more third party servers and receive an indication as to whether the financial transaction was successful.

At 1334, the payment system may be configured to send a receipt for the payment to the consumer device. The receipt may alternatively, and/or additionally, be sent to merchant device and then sent from the merchant device to the consumer device (e.g., when the consumer device does not include an active connection to the payment server and/or when the payment server is otherwise unable to communicate with the consumer device).

Figure 18:
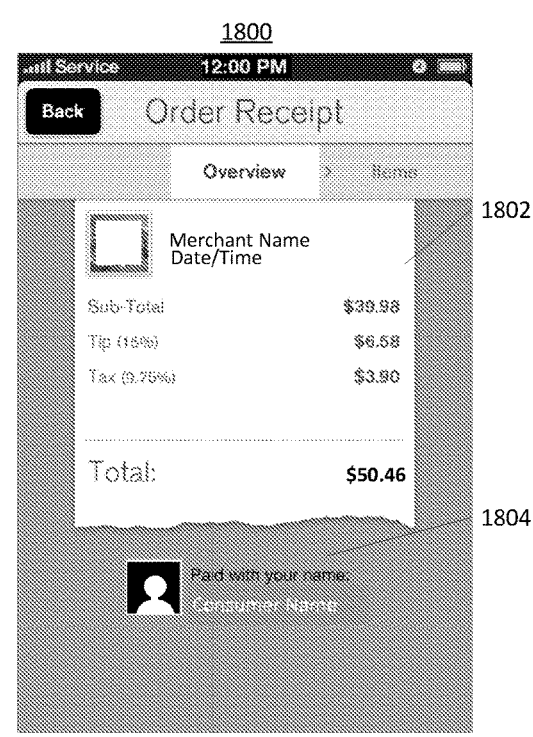
Figure 19:

FIG. 18 shows an example receipt display 1800, in accordance with some embodiments. Receipt display 1800 may be shown on the consumer device to provide an indication to the consumer that the financial transaction was successfully. As such, receipt display 1800 may include transaction data at 1802 and payment confirmation display 1804. FIG. 19 shows a receipt notification display 1900 that may be shown additionally and/or alternatively shown on the consumer device. For example, receipt notification display 1900 may be shown responsive to the consumer device receiving the receipt. Receipt notification display 1900 may include notification selection 1902 that includes transaction price indicator 1904 and merchant indicator 1906. In some embodiments, displays providing receipt information (e.g., display 1800 and/or 2000-2200) may be shown on the consumer device responsive to the consumer selecting notification selection 1902 to provide more information about the receipt.

Figure 20:
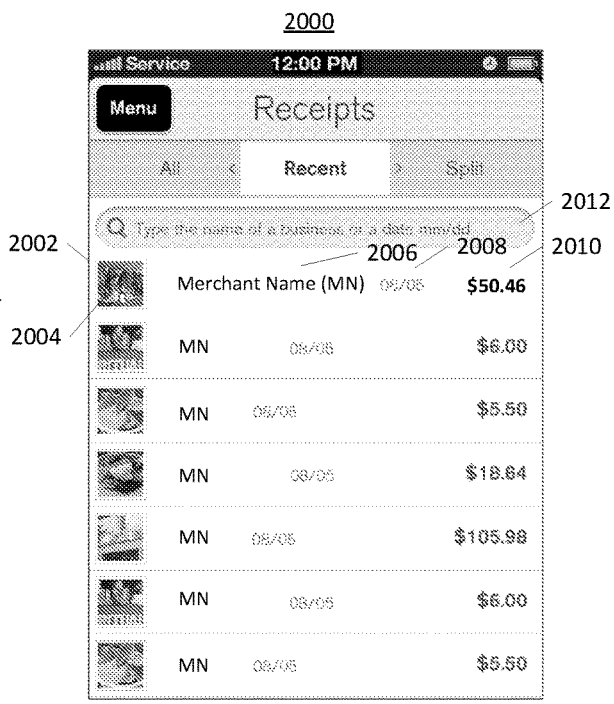

FIG. 20 shows an example receipt listing display 2000, in accordance with some embodiments. Receipt listing display 2000 may be configured to provide a listing of receipts associated with the payment account. Receipt listing display 2000 may be accessed, for example, by selecting receipts selection 1506 in payment service menu display 1500. As shown, a listed receipt (e.g., listed receipt 2002) may include a display of merchant image 2004 (e.g., a trademark, symbol, slogan, icon, graphic, photograph, etc.), merchant name 2006, transaction date 2008 and/or amount paid 2010. The receipts may be listed based on virtually any ordering criteria, such as the transaction date or merchant name, in some example embodiments.

In some embodiments, receipts may be searchable. For example, a consumer may enter search criteria (e.g., merchant name or transaction date as shown in FIG. 2000) in receipt search 2012. Responsive to entering the search, the consumer device may show a listing of receipts that fit, or come closest to fitting, the search criteria.

Figure 21:
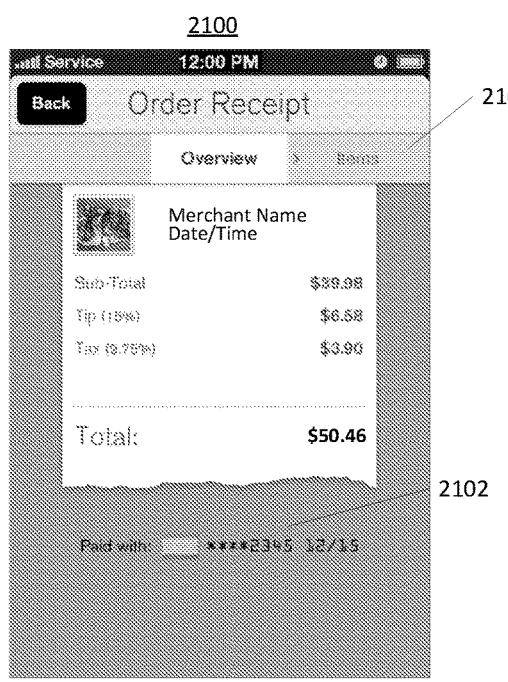

In some embodiments, the listed receipts in receipt listing display 2000 may be selectable. Upon selecting a listed receipt, additional information about the receipt may be shown on the consumer device. For example, upon selecting listed receipt 2002, the consumer device may be configured to show receipt display 2100. The discussion above regarding receipt display 1800 may be applicable to receipt display 2100. In some embodiments, receipt display 2002 may alternatively and/or additionally include payment source identifier 1806. As shown in FIG. 21, payment source identifier 2102 indicates that the payment was made with a credit card ending having a credit card number ending with 2345 and a 12/15 expiration date.

Figure 22:
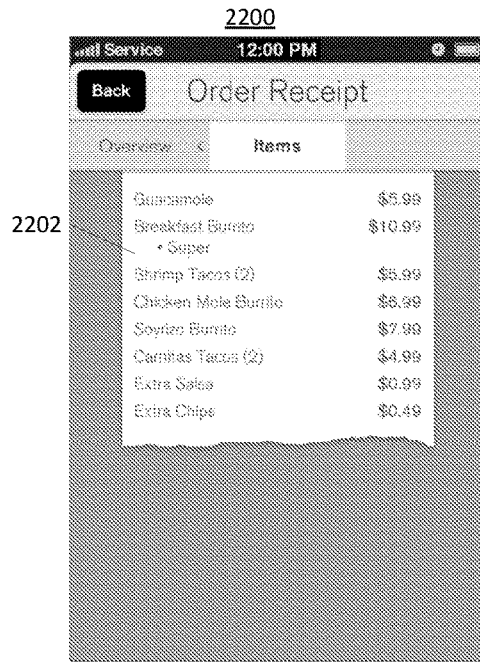

In some embodiments, the consumer device may be configured to allow the consumer to view items associated with the receipt. For example, the consumer may select receipt item selection 2104 in receipt display 2100. FIG. 22 shows an example view receipt items display 2200 that includes receipt items listing 2202. As shown, receipt items listing 2202 may include a list of items and associated price data.

Returning to FIG. 13, the payment system may be configured to send a confirmation to the merchant device at 1336. For example, the confirmation may indicate whether the payment was successfully processed. An indication may be shown on the merchant device to alert the merchant. For example, if the payment was not successful, the merchant may request that the consumer provide an alternate form of payment and/or to resubmit the payment via the consumer device.

As discussed above, the techniques disclosed herein may apply not only to payments between consumer devices and merchant devices, but to any type of suitable devices or "peer devices." For example, a merchant may use a first device to pay a second merchant using a second device. In another example, a consumer may use a first device to pay a second consumer using a second device. In that sense, method 1300 may allow two users of any kind to access their payment accounts, discover compatible devices, and/or make payments with each other for any purpose.

FIG. 14 shows a flow chart of an example of a method 1400 of making a payment, performed in accordance with some embodiments. Some of the discussion above regarding method 1300 may be applicable to method 1400 and are not repeated in detail. Method 1400 may allow a first peer device to provide a payment to a second peer device. Thus the discussion regarding the first peer device may be applicable to the second peer device, and vice versa. Method 1400 may be used among merchants and/or other peer devices, and/or simply when the payee does not have network access to the payment system at the time the transaction occurs with the payor.

At 1402, the payment system (e.g., payment server 2406 shown in FIG. 24) may be configured to send wallet identifying data to a first peer device (e.g., a consumer device or a merchant device). The wallet identifying data may be configured to secure messages sent from the first peer device.

At 1404-1408, the first peer device and the second peer device may be configured to form a connection. As discussed above regarding method 1300 at 1304-1308, the connection may be formed without the first peer device and/or the second peer device having active Internet access at the time of the connection (e.g., an active connection to the one or more servers). Instead, a personal area network that allows for device discovery, or similar techniques, may be used.

At 1410, the first peer device may be configured to send the wallet identifying data to the second peer device. If the second peer device has an active connection to the payment system, the wallet identifying data may be sent to the payment system and consumer data may be returned to the second peer device from the payment system after validation, as discussed above.

Additionally and/or alternatively, if the second peer device does not include the active connection to the payment system, the second peer device may be configured to store the wallet identifying data at 1412. In some embodiments, the first peer device may be further configured to send some or all of the consumer information at 1412 (e.g., as discussed at 1320 of method 1300) to the second peer device. In that sense, some or all of the consumer information may be signed or otherwise secured with the wallet identifying data. For example, private information such as payment account data may be secured while basic information (e.g., name, image data) may be sent without the wallet identifying data. Consumer information that is not secured may be readily accessible by the second peer device without sending the wallet identifying data to the payment system for secure retrieval (e.g., as discussed at 1316 of method 1300).

At 1414, the second peer device may be configured to receive product identifying data for one or more items. The discussion above regarding 1322 of method 1300 may be applicable at 1414. For example, the items may be entered into the second peer device and/or be entered into the first peer device and then sent to the second peer device. If the items are entered by the second peer device, the second peer device may be further configured to generate a total cost (e.g., based on price data) and to send the total cost to the first peer device at 1416. In another example, the first peer device and/or the second peer device may be allowed to simply enter the total cost and/or select items from a virtual listing.

At 1418, the first peer device may be configured to determine whether to approve the payment. At 1420, the first peer device may be configured to send consumer approval data secured with the wallet identifying data to the second peer device. The discussion above regarding 1326-1328 of method 1300 may be applicable at 1418-1420.

In some embodiments, at least some of the consumer approval data may be sent by the first peer device such that the second peer device may determine whether the payment was approved without communicating with the payment system. For example, a message or a part of a message may include an unsecured indication regarding whether the payment is approved or disapproved that may be understood by the second device. Other data (e.g., consumer data, transaction data, and/or the additional indication of consent) may be signed or otherwise secured with the wallet identifying data such that the content is accessible only via the payment system.

At 1422, the consumer approval data secured with the wallet identifying data may be stored by the second peer device (or a separate storage device that may be accessed by the second peer device). For example, if the second peer device does not include an active connection to the payment system, the second peer device may be configured to store the data until a connection with the payment system is established. Alternatively and/or additionally, if the second peer device does include an active connection, the second peer device may be configured to send the consumer approval data (or secured payment approval data, as discussed above) to the payment system at 1422.

At 1424, the second peer device may establish a secure connection with the payment system (e.g., if the secure connection is not already active). At 1424, the second peer device may send the consumer approval data (or secured payment approval data, as discussed above) data to the payment system. At 1426, the payment system may be configured to validate and process the payment. At 1428, the payment system may send a receipt to the first peer device (either directly, or via the second peer device). At 1430, the payment system may be configured to send a payment confirmation to the second peer device. The discussion above at 1314 and 1320-1326 of method 1300 may be applicable at 1424-1430.

Exemplary System Architecture

FIG. 24 shows system 2400 including an example network architecture, which may include one or more devices and sub-systems that are configured to implement some embodiments discussed herein. For example, system 2400 may include payment system 2402, which can include, for example, payment server 2404 and payment database 2406, among other things (not shown). Payment server 2404 may be any suitable network server and/or other type of processing device. Payment database 2406 may be any suitable network database configured to store information such as merchant and consumer information, login data, payment account data, payment source data, transaction data, and/or wallet identifying data, such as may be used to facilitate payment as discussed herein. In this regard, system 2402 may include, for example, at least one backend data server, network database, cloud computing device, among other things.

Payment system 2402 may be coupled to one or more merchant devices (e.g., merchant device 2410) via network 2408. In this regard, network 2408 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 2408 may include a cellular telephone, an 802.11, 802.16, 802.20, and/or WiMax network. Further, the network 2408 may include a public network, such as the Internet, a private network, such as an intranet, or combinations thereof, and may utilize a variety of networking protocols now available or later developed including, but not limited to TCP/IP based networking protocols.

As discussed above, merchant device 2410 may be associated with a merchant, such as a retail store, restaurant, etc.

In some embodiments, merchant device 2410 may be a POS device that is configured to receive payments at the merchant's shop. As such, merchant device 2410 may include a personal computer and/or other networked device, such as a cellular phone, tablet computer, mobile device, etc., that may be used for any suitable purpose in addition to providing point-of-sale functionality at the restaurant. Accordingly, display 2300 may be provided to a merchant by a POS device.

System 2400 may further include one or more consumer devices (e.g., consumer device 2412). As shown in FIG. 33, consumer device 2412 may connect with merchant device 2410 via network 2408 and/or PAN network 2416. As such, consumer device 2412 may be configured to make payments with merchant device 2410 via PAN network 2416 even if consumer device 2412 and/or merchant device 2410 do not have active connections with network 2408.

In some embodiments, system 2400 may further include one or more third party systems (e.g., third party system 2414), among other things. In some embodiments, different third party systems may be associated with different types of payment sources. Thus for each payment source, data may be sent to an appropriate third party system (e.g., a credit card transaction server, etc.) to validate and/or process payments.

In some embodiments, the payment system 2400 may be a multi-tenant database system configured to provide payment services to a plurality of consumers and merchants. Additionally and/or alternatively, payment system 2400 may be configured to include, or work in connection with, online ordering systems (e.g., shop online and pickup), promotional systems (e.g., deal voucher accounts, offerings, purchases, and redemptions, where the value of a redeemed voucher may be deducted from the payment), merchant systems (e.g., kitchen systems for restaurants), and/or appointment systems (e.g., scheduling a reservation at a restaurant). It is appreciated that the payment techniques disclosed herein may be applicable to any environment that involves financial transactions.

FIG. 25 shows a schematic block diagram of circuitry 2500, some or all of which may be included in, for example, payment system 2404, consumer device 2412, and/or merchant device 2410. As illustrated in FIG. 25, in accordance with some example embodiments, circuitry 2500 may include various means, such as one or more processors 2502, memories 2504, communications modules 2506, and/or input/output modules 2508.

In some embodiments, such as when circuitry 2500 is included in merchant device 2410 and/or payment system 2402, payment/redemption module 2510 may also or instead be included. As referred to herein, "module" includes hardware, software and/or firmware configured to perform one or more particular functions. In this regard, the means of circuitry 2500 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 2504) that is executable by a suitably configured processing device (e.g., processor 2502), or some combination thereof.

Processor 2502 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 25 as a single processor, in some embodiments, processor 2502 comprises a plurality of processors. The plurality of processors may be embodied on a single computing device or may be distributed across a plurality of computing devices collectively configured to function as circuitry 2500. The plurality of processors may be in operative communication with each other and may be collectively configured to perform one or more functionalities of circuitry 2500 as described herein. In an example embodiment, processor 2502 is configured to execute instructions stored in memory 2504 or otherwise accessible to processor 2502. These instructions, when executed by processor 2502, may cause circuitry 2500 to perform one or more of the functionalities of circuitry 2500 as described herein.

Whether configured by hardware, firmware/software methods, or by a combination thereof, processor 2502 may comprise an entity capable of performing operations according to embodiments of the present invention while configured accordingly. Thus, for example, when processor 2502 is embodied as an ASIC, FPGA or the like, processor 2502 may comprise specifically configured hardware for conducting one or more operations described herein. As another example, when processor 2502 is embodied as an executor of instructions, such as may be stored in memory 2504, the instructions may specifically configure processor 2502 to perform one or more algorithms and operations described herein, such as those discussed in connection with FIGS. 1, 2, 13 and 14.

Memory 2504 may comprise, for example, volatile memory, non-volatile memory, or some combination thereof. Although illustrated in FIG. 25 as a single memory, memory 2504 may comprise a plurality of memory components. The plurality of memory components may be embodied on a single computing device or distributed across a plurality of computing devices. In various embodiments, memory 2504 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 2504 may be configured to store information, data (including deal parameter data and/or analytics data), applications, instructions, or the like for enabling circuitry 2500 to carry out various functions in accordance with example embodiments of the present invention. For example, in at least some embodiments, memory 2504 is configured to buffer input data for processing by processor 2502. Additionally or alternatively, in at least some embodiments, memory 2504 is configured to store program instructions for execution by processor 2502. Memory 2504 may store information in the form of static and/or dynamic information. This stored information may be stored and/or used by circuitry 2500 during the course of performing its functionalities.

Communications module 2506 may be embodied as any device or means embodied in circuitry, hardware, a computer program product comprising computer readable program instructions stored on a computer readable medium (e.g., memory 2504) and executed by a processing device (e.g., processor 2502), or a combination thereof that is configured to receive and/or transmit data from/to another device, such as, for example, a second circuitry 2500 and/or the like. In some embodiments, communications module 2506 (like other components discussed herein) can be at least partially embodied as or otherwise controlled by processor 2502. In this regard, communications module 2506 may be in communication with processor 2502, such as via a bus. Communications module 2506 may include, for example, an antenna, a transmitter, a receiver, a transceiver, network interface card and/or supporting hardware and/or firmware/software for enabling communications with another computing device. Communications module 2506 may be configured to receive and/or transmit any data that may be stored by memory 2504 using any protocol that may be used for communications between computing devices. Communications module 2506 may additionally or alternatively be in communication with the memory 2504, input/output module 2508 and/or any other component of circuitry 2500, such as via a bus.

Input/output module 2508 may be in communication with processor 2502 to receive an indication of a user input and/or to provide an audible, visual, mechanical, or other output to a user (e.g., merchant and/or consumer). Some example visual outputs that may be provided to a user by circuitry 2500 are discussed in connection with FIGS. 3-12 and 15-23. As such, input/output module 2508 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 2500 is embodied as a server or database, aspects of input/output module 2508 may be reduced as compared to embodiments where circuitry 2500 is implemented as an end-user machine (e.g., consumer device and/or merchant device) or other type of device designed for complex user interactions. In some embodiments (like other components discussed herein), input/output module 2508 may even be eliminated from circuitry 2500. Alternatively, such as in embodiments wherein circuitry 2500 is embodied as a server or database, at least some aspects of input/output module 2508 may be embodied on an apparatus used by a user that is in communication with circuitry 2500, such as for example, merchant device 2410 and/or consumer device 2412. Input/output module 2508 may be in communication with memory 2504, communications module 2506, and/or any other component(s), such as via a bus. Although more than one input/output module and/or other component can be included in circuitry 2500, only one is shown in FIG. 25 to avoid overcomplicating the drawing (like the other components discussed herein).

Payment/redemption module 2510 may also or instead be included and configured to perform the functionality discussed herein related to facilitating payment transactions discussed above. In some embodiments, some or all of the functionality facilitating payment transactions may be performed by processor 2502. In this regard, the example processes and algorithms discussed herein can be performed by at least one processor 2502 and/or payment/redemption module 2510. For example, non-transitory computer readable storage media can be configured to store firmware, one or more application programs, and/or other software, which include instructions and other computer-readable program code portions that can be executed to control each processor (e.g., processor 2502 and/or payment/redemption module 2510) of the components of system 2500 to implement various operations, including the examples shown above. As such, a series of computer-readable program code portions are embodied in one or more computer program products and can be used, with a computing device, server, and/or other programmable apparatus, to produce machine-implemented processes.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 2500. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 2502 and/or deal payment/redemption module 2510 discussed above with reference to FIG. 25, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 2504) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block/step of the circuit diagrams and process flowcharts, and combinations of blocks/steps in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. For example, although the examples discussed herein do not require the consumer to present a form of payment (such as a credit card) to the merchant, some embodiments of the merchant device can be configured to work with one or more peripheral devices that can receive payment information directly from a consumer (such as a credit card reader, radio frequency identification reader, etc.) in addition to or instead of from the payment server. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A payment apparatus for facilitating a secure transaction using a secure communication protocol between the payment apparatus and a peer device, the payment apparatus comprising at least one processor and at least one memory including computer-executable program instructions, the computer-executable program instructions configured to, with the at least one processor, cause the payment apparatus to at least:

initiate a discovering service for establishing a wireless connection with the peer device;

following the initiating of the discovering service, establish the wireless connection with the peer device when the payment apparatus is within a direct wireless communicable range of the peer device;

receive wallet identifying data from the peer device over the wireless connection, wherein the wallet identifying data (i) uniquely identifies the peer device from other peer devices, (ii) is generated based at least in part on a random code that uniquely identifies a payment account of a user associated with the peer device, and (iii) is configured to secure data transfers between the peer device and the payment apparatus;

receive consumer approval data secured with the wallet identifying data from the peer device via the wireless connection;

establish a secure connection with a payment system;

send the consumer approval data secured with the wallet identifying data to the payment system; and receive a transaction confirmation from the payment system indicating validation of the consumer approval data received from the peer device based on verifying that the consumer approval data was programmatically secured using the wallet identifying data.

2. The payment apparatus of claim 1, wherein the computer-executable program instructions are further configured to, with the at least one processor, cause the payment apparatus to at least:

receive product identifying data; and
transmit an approval request indication to the peer device over the wireless connection to prompt receipt of the consumer approval data.

3. The payment apparatus of claim 1, wherein the secure connection with the payment system is established over an Internet connection.

4. The payment apparatus of claim 1, wherein the payment apparatus is configured to store the received consumer approval data secured with the wallet identifying data to a local memory of the payment apparatus in circumstances in which the secure connection with the payment system cannot immediately be established.

5. The payment apparatus of claim 1, wherein the discovering service is initiated under a Bluetooth protocol for establishing an active personal area network connection.

6. The payment apparatus of claim 1, wherein the consumer approval data is generated automatically by the peer device based on one or more trigger conditions being satisfied.

7. The payment apparatus of claim 6, wherein the one or more trigger conditions comprise one or more of a merchant identifier, merchant location, merchant type, and a monetary amount.

8. The payment apparatus of claim 6, wherein the one or more trigger conditions comprise a mobile device location.

9. A computer-implemented method for facilitating a secure transaction using a secure communication protocol between a payment apparatus and a peer device, the computer-implemented method comprising:
  initiating a discovering service for establishing a wireless connection between the payment apparatus and the peer device;
  following the initiating of the discovering service, establishing the wireless connection with the peer device when the payment apparatus is within a direct wireless communicable range of the peer device;
  receiving wallet identifying data from the peer device over the wireless connection, wherein the wallet identifying data (i) uniquely identifies the peer device from other peer devices, (ii) is generated based at least in part on a random code that uniquely identifies a payment account of a user associated with the peer device, and (iii) is configured to secure data transfers between the peer device and the payment apparatus;
  receiving consumer approval data secured with the wallet identifying data from the peer device via the wireless connection;
  establishing a secure connection between the payment apparatus and a payment system;
  sending the consumer approval data secured with the wallet identifying data from the payment apparatus to the payment system; and
  receiving a transaction confirmation from the payment system to the payment apparatus indicating validation of the consumer approval data received from the peer device based on verifying that the consumer approval data was programmatically secured using the wallet identifying data.

10. The computer-implemented method of claim 9, wherein the computer-implemented method further comprises:
  receiving product identifying data; and
  transmitting an approval request indication from the payment apparatus to the peer device over the wireless connection to prompt receipt of the consumer approval data.

11. The computer-implemented method of claim 9, wherein the secure connection between the payment apparatus and the payment system is established over an Internet connection.

12. The computer-implemented method of claim 9, wherein the computer-implemented method further comprises: storing the received consumer approval data secured with the wallet identifying data to a local memory of the payment apparatus in circumstances in which the secure connection with the payment system cannot immediately be established.

13. The computer-implemented method of claim 9, wherein the discovering service is initiated under a Bluetooth protocol for establishing an active personal area network connection.

14. The computer-implemented method of claim 9, wherein the consumer approval data is generated automatically by the peer device based on one or more trigger conditions being satisfied.

15. The computer-implemented method of claim 14, wherein the one or more trigger conditions comprise one or more of a merchant identifier, merchant location, merchant type, and a monetary amount.

16. The computer-implemented method of claim 14, wherein the one or more trigger conditions comprise a mobile device location.

17. A computer program product for facilitating a secure transaction using a secure communication protocol, the computer program product comprising computer-executable program instructions, the computer-executable program instructions configured to, when executed by at least one processor, to:
  initiate a discovering service for establishing a wireless connection between a payment apparatus and a peer device;
  following the initiating of the discovering service, establish the wireless connection between the payment apparatus and the peer device when the payment apparatus is within a direct wireless communicable range of the peer device;
  receive wallet identifying data from the peer device over the wireless connection, wherein the wallet identifying data (i) uniquely identifies the peer device from other peer devices, (ii) is generated based at least in part on a random code that uniquely identifies a payment account of a user associated with the peer device, and (iii) is configured to secure data transfers between the peer device and the payment apparatus;
  receive consumer approval data secured with the wallet identifying data from the peer device to the payment apparatus via the wireless connection;
  establish a secure connection between the payment apparatus and a payment system;
  send the consumer approval data secured with the wallet identifying data from the payment apparatus to the payment system; and
  receive a transaction confirmation from the payment system indicating validation of the consumer approval data received from the peer device based on verifying that the consumer approval data was programmatically secured using the wallet identifying data.

18. The computer program product of claim 17, wherein the computer-executable program instructions are further configured to, when executed by the at least one processor, to:
  receive product identifying data; and transmit an approval request indication to the peer device over the wireless connection to prompt receipt of the consumer approval data.

19. The computer program product of claim 17, wherein the secure connection with the payment system is established over an Internet connection.

20. The computer program product of claim 17, wherein the computer program product is further configured, when executed by the at least one processor, to: store the received consumer approval data secured with the wallet identifying data to a local memory of the payment apparatus in circumstances in which the secure connection with the payment system cannot immediately be established.

* * * * *